(12) United States Patent
Park et al.

(10) Patent No.: US 12,291,013 B2
(45) Date of Patent: May 6, 2025

(54) APPARATUS FOR MANUFACTURING DISPLAY DEVICE AND METHOD FOR MANUFACTURING DISPLAY DEVICE

(71) Applicant: Samsung Display Co., LTD., Yongin-si (KR)

(72) Inventors: Sung Dong Park, Asan-si (KR); Kwang Min Lee, Goyang-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/399,980

(22) Filed: Dec. 29, 2023

(65) Prior Publication Data

US 2024/0131835 A1 Apr. 25, 2024
US 2024/0227381 A9 Jul. 11, 2024

Related U.S. Application Data

(62) Division of application No. 17/513,811, filed on Oct. 28, 2021, now Pat. No. 11,890,851.

(30) Foreign Application Priority Data

Oct. 29, 2020 (KR) .................. 10-2020-0142044

(51) Int. Cl.
*B32B 43/00* (2006.01)
*B32B 38/00* (2006.01)
*B32B 38/18* (2006.01)

(52) U.S. Cl.
CPC .......... *B32B 43/006* (2013.01); *B32B 38/105* (2013.01); *B32B 38/1825* (2013.01);
(Continued)

(58) Field of Classification Search
CPC ............ B32B 43/006; Y10T 156/1174; Y10T 156/195
See application file for complete search history.

(56) References Cited

U.S. PATENT DOCUMENTS 10,081,173 B2 9/2018 Choi et al.
10,177,327 B2 1/2019 Jung et al.
(Continued)

FOREIGN PATENT DOCUMENTS

KR 10-2009-0017529 2/2009
KR 10-0901498 6/2009
(Continued)

OTHER PUBLICATIONS

Non-Final Office Action issued Jun. 14, 2023, in U.S. Appl. No. 17/513,811.
(Continued)

*Primary Examiner* — Philip C Tucker
*Assistant Examiner* — Nickolas R Harm
(74) *Attorney, Agent, or Firm* — KILE PARK REED & HOUTTEMAN PLLC

(57) ABSTRACT

A method for manufacturing a display device includes a stage; a first guide unit positioned on one side of the stage in a first direction and extending in a second direction crossing the first direction; and a first peeling unit disposed on the first guide unit, wherein the first peeling unit includes a first moving part configured to move along the first guide unit, a first rotating part coupled to the other side of the first moving part in the first direction and configured to rotate about an axis extending in the first direction, and a first gripping part coupled to the other side of the first rotating part in the first direction and disposed to overlap the stage.

20 Claims, 21 Drawing Sheets

(52) U.S. Cl.
CPC ........ *B32B 43/003* (2013.01); *B32B 2457/20* (2013.01); *Y10T 156/1174* (2015.01); *Y10T 156/1179* (2015.01); *Y10T 156/195* (2015.01); *Y10T 156/1961* (2015.01); *Y10T 156/1967* (2015.01)

(56) References Cited

U.S. PATENT DOCUMENTS

| | | |
|---|---|---|
| 10,843,400 B2 | 11/2020 | Han et al. |
| 11,101,454 B2 | 8/2021 | Jung et al. |
| 2008/0236743 A1 | 10/2008 | Kye et al. |
| 2016/0159069 A1 | 6/2016 | Huang et al. |
| 2017/0158449 A1 | 6/2017 | Kramer |
| 2020/0168848 A1 | 5/2020 | Jung et al. |
| 2020/0391498 A1 | 12/2020 | Jung et al. |
| 2020/0406397 A1 | 12/2020 | Roh et al. |

FOREIGN PATENT DOCUMENTS

| | | |
|---|---|---|
| KR | 10-1612076 | 4/2016 |
| KR | 10-2018-0029739 | 3/2018 |
| KR | 1020180145651 | * 11/2018 |
| KR | 10-2019-0042131 | 4/2019 |
| KR | 10-2019-0063504 | 6/2019 |
| KR | 10-2020-0060654 | 6/2020 |
| KR | 10-2020-0060655 | 6/2020 |
| KR | 10-2020-0144163 | 12/2020 |
| KR | 10-2021-0000805 | 1/2021 |
| KR | 10-2021-0104283 | 8/2021 |

OTHER PUBLICATIONS

Notice of Allowance issued Sep. 29, 2023, in U.S. Appl. No. 17/513,811.

* cited by examiner

FIG. 2
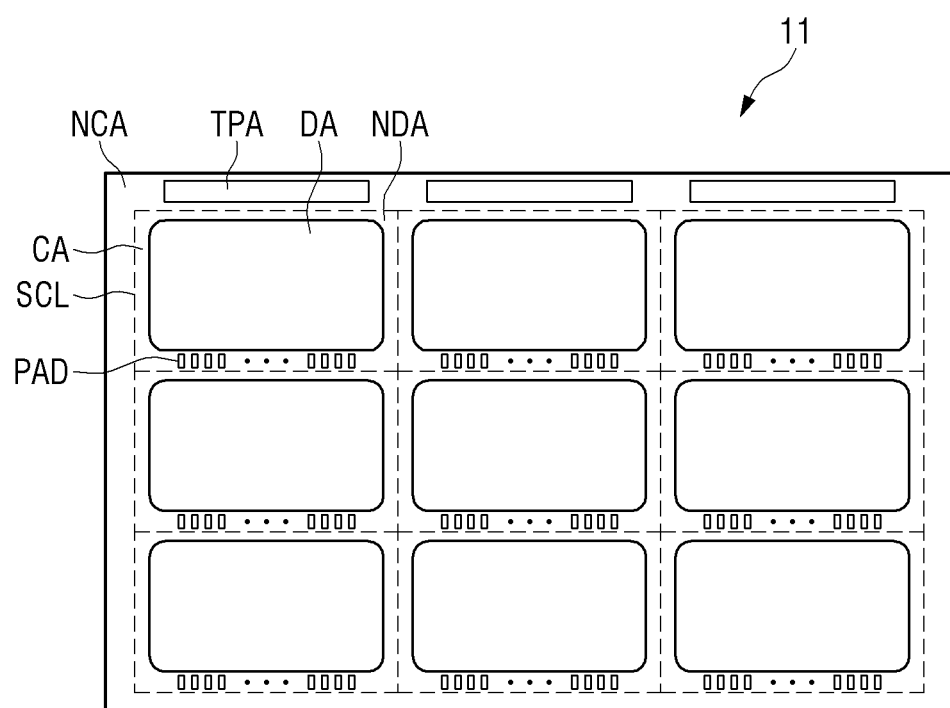
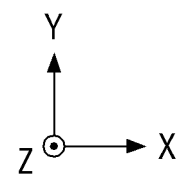

APPARATUS FOR MANUFACTURING DISPLAY DEVICE AND METHOD FOR MANUFACTURING DISPLAY DEVICE

CROSS-REFERENCE TO RELATED APPLICATION

This application is a Divisional of U.S. patent application Ser. No. 17/513,811, filed Oct. 28, 2021, now issued as U.S. Pat. No. 11,890,851, which issued on Feb. 6, 2024, and that claims priority from and the benefit of Korean Patent Application No. 10-2020-0142044 filed on Oct. 29, 2020, each of which is hereby incorporated by reference for all purposes as if fully set forth herein.

BACKGROUND

Field

Embodiments of the invention relate generally to an apparatus for manufacturing a display device and a method for manufacturing a display device.

Discussion of the Background

The importance of display devices has steadily increased with the development of multimedia technology. In response thereto, various types of display devices such as an organic light emitting display (OLED), a liquid crystal display (LCD) and the like have been used. Such display devices have been variously applied to various mobile electronic devices, for example, portable electronic devices such as a smart phone, a smart watch, and a tablet PC.

During a manufacturing process of the display device, a display panel may be protected by a protective film attached to one surface thereof. The protective film protecting the display panel may be partially peeled off if necessary.

The above information disclosed in this Background section is only for understanding of the background of the inventive concepts, and, therefore, it may contain information that does not constitute prior art.

SUMMARY

Aspects of the inventive concepts provide an apparatus and a method for manufacturing a display device, capable of stably peeling off a dummy region of a protective film having a grid pattern.

Aspects of the inventive concepts also provide an apparatus and a method for manufacturing a display device, capable of effectively preventing damage to an active region of a protective film when a dummy region of the protective film is peeled off.

Aspects of the inventive concepts also provide a method for manufacturing a display device, capable of effectively preventing air bubbles from being generated in an active region when a protective film is peeled off.

Aspects of the inventive concepts also provide an apparatus and a method for is manufacturing a display device, capable of peeling off a protective film having a grid pattern at once.

However, aspects of the inventive concepts are not restricted to those set forth herein. The above and other aspects of the inventive concepts will become more apparent to one of ordinary skill in the art to which the inventive concepts pertains by referencing the detailed description of the inventive concepts given below.

Additional features of the inventive concepts will be set forth in the description which follows, and in part will be apparent from the description, or may be learned by practice of the inventive concepts.

An embodiment of an apparatus for manufacturing a display device includes a stage; a first guide unit positioned on one side of the stage in a first direction and extending in a second direction crossing the first direction; and a first peeling unit disposed on the first guide unit, wherein the first peeling unit includes a first moving part configured to move along the first guide unit, a first rotating part coupled to the other side of the first moving part in the first direction and configured to rotate about an axis extending in the first direction, and a first gripping part coupled to the other side of the first rotating part in the first direction and disposed to overlap the stage.

An embodiment of a method for manufacturing a display device includes preparing a target substrate to be peeled including a protective film; forming a cutting line on the protective film; initially peeling the protective film; providing the initially peeled protective film to a first peeling unit; and gripping the protective film with the first peeling unit to peel off the protective film while moving and rotating the first peeling unit.

In the apparatus for manufacturing the display device according to embodiments described herein, damage to the active region of the protective film may be effectively prevented is when the dummy region of the protective film is peeled off.

In the method for manufacturing the display device according to embodiments described herein, damage to the active region of the protective film and generation of the air bubbles in the active region may be effectively prevented when the dummy region of the protective film is peeled off.

It should be noted that the effects of the inventive concepts are not limited to those described above, and other effects of the inventive concepts will be apparent from the following description.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 2 is a plan view illustrating a parent substrate according to embodiments described herein;

DETAILED DESCRIPTION OF THE EMBODIMENTS

Figure 1:
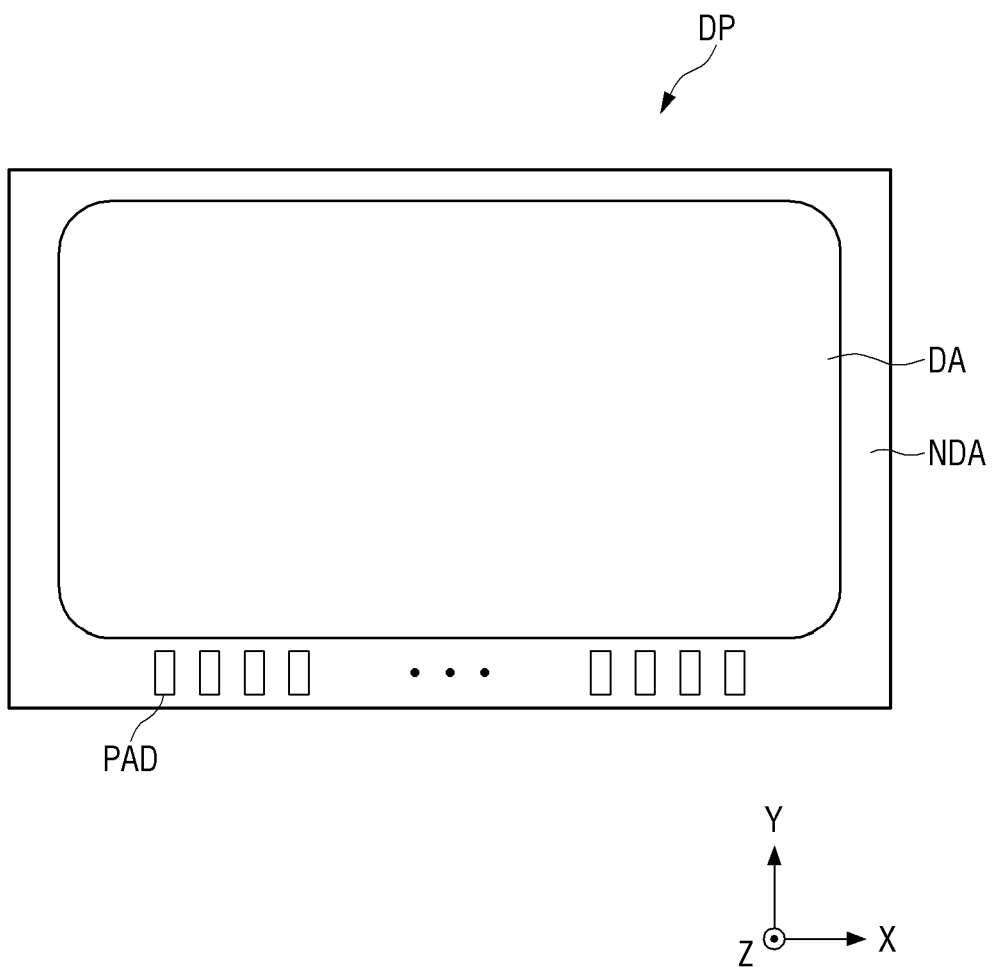
FIG. 1 is a plan view illustrating a display panel according to embodiments described herein.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between is illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular is embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The present invention will now be described more fully hereinafter with reference to the accompanying drawings, in which preferred embodiments of the invention are illustrated. This invention may, however, be embodied in different forms and should not be construed as limited to the embodiments set forth herein. Rather, these embodiments are provided so that this is disclosure will be thorough and complete, and will filly convey the scope of the invention to those skilled in the art.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The same reference numbers indicate the same components throughout the specification.

Hereinafter, embodiments will be described in detail with reference to the accompanying drawings.

FIG. 1 is a plan view illustrating a display panel according to embodiments described herein. FIG. 2 is a plan view illustrating a parent substrate according to embodiments described herein.

Referring to FIGS. 1 and 2, a display panel DP may be included in a display device that displays a moving image or a still image. For example, the display panel DP may be included not only in portable electronic devices such as a mobile phone, a smart phone, a tablet personal computer (PC), a smart watch, a watch phone, a mobile communication terminal, an electronic notebook, an e-book, a portable multimedia player (PMP), a navigation device, and an ultra mobile PC (UMPC), but also in various display devices such as a television, a laptop, a monitor, a billboard, and an Internet of Things (IoT) device, and may be used for a display screen.

The display panel DP according to embodiments described herein may be used in any one of an organic light emitting display device, a liquid crystal display device, a plasma display device, a field emission display device, an electrophoretic display device, an electrowetting display device, a quantum dot light emitting display device, a micro LED display device, and the like.

The display panel DP may have a rectangular shape having a first side in a first direction X and a second side in a second direction Y. FIG. 1 illustrates that the length of the first side in the first direction X is greater than the length of the second side in the second direction Y, but the inventive concepts are not limited thereto, and the length of the first side may be equal to or smaller than the length of the second side. A corner where the first side in the first direction X and the second side in the second direction Y meet may be right-angled, but is not limited thereto and may be rounded to have a predetermined curvature.

The display panel DP may include a display area DA and a non-display area NDA that includes a peripheral area of the display area DA. The display area DA may be disposed in a center of the display panel DP and may occupy most of the display panel DP. Although not illustrated, a plurality of scan lines extending in the first direction X, a plurality of data lines extending in the second direction Y, and a plurality of pixels may be disposed in the display area DA. Each pixel (not illustrated) may be connected to the scan line (not illustrated) and the data line (not illustrated), and when a scan signal is applied to the scan line (not illustrated), may receive a data voltage of the data line (not illustrated). Each pixel (not illustrated) may include a light emitting element that emits light by the data voltage.

The non-display area NDA may be disposed to surround the display area DA. In the display panel DP, the non-display area NDA positioned on the other side of the display area DA in the second direction Y may be larger in size than the non-display area NDA positioned on one side of the display area DA in the second direction Y, and the non-display area NDA positioned on one side and the other side of the display area DA in the first direction X. However, the inventive concepts are not limited thereto. A plurality of pads PAD may be disposed in the non-display area NDA positioned on the other side of the display area DA in the second direction Y. The plurality of pads PAD may be arranged along the first direction X. A flexible film (COF) on which a driving circuit and the like are mounted may be bonded to the plurality of pads PAD to transmit a driving signal to the pixels.

Display panels DP may be formed by cutting a parent substrate 11, on which the plurality of scan lines, the plurality of data lines, the plurality of pixels, and the like are formed, along a substrate cutting line SCL on a cell basis. The parent substrate 11 may include a cell area CA positioned inside the substrate cutting line SCL and a non-cell area NCA disposed to surround the cell area CA.

Each cell area CA of the parent substrate 11 may be formed as the display panel DP through a later process. FIG. 2 illustrates that the parent substrate 11 includes a total of nine cell areas CA having three rows in the first direction X and three columns in the second direction Y, but the number of cells included in the parent substrate 11 is not limited thereto. In this example, a total of nine display panels DP may be formed from the parent substrate 11 illustrated in FIG. 2.

The non-cell area NCA may include a plurality of test pad areas TPA. Although not illustrated, the test pad areas TPA may each include a plurality of test pads which are electrically connected to the pads PAD and capable of inspecting whether the display panel DP is defective in is image quality. A voltage applied to the test pads (not illustrated) in the test pad area TPA may be applied to various wirings of the display panel DP through the pads PAD. Accordingly, it is possible to inspect whether the display panel DP is defective in image quality through the test pad area TPA.

According to embodiments, one test pad area TPA may be disposed for each column of the cell areas CA. For example, one test pad area TPA may be disposed at one side of each column of the cell areas CA in the second direction Y, but the number and arrangement of the test pad areas TPA are not limited thereto.

As will be described later, a protective film PF may be attached to the parent substrate 11. The protective film PF may serve to protect the top surface of the parent substrate 11 during a manufacturing process before attaching a polarizing film. The cutting of the parent substrate 11 may be performed, after peeling off a part of the protective film PF, in an area where the protective film PF is peeled off. That is, before the process of cutting the parent substrate 11, a process of peeling off a part of the protective film PF may be performed. Hereinafter, an apparatus 1 for manufacturing the display device according to embodiments may be a peeling apparatus used to peel off the protective film PF from the parent substrate 11.

Figure 3:
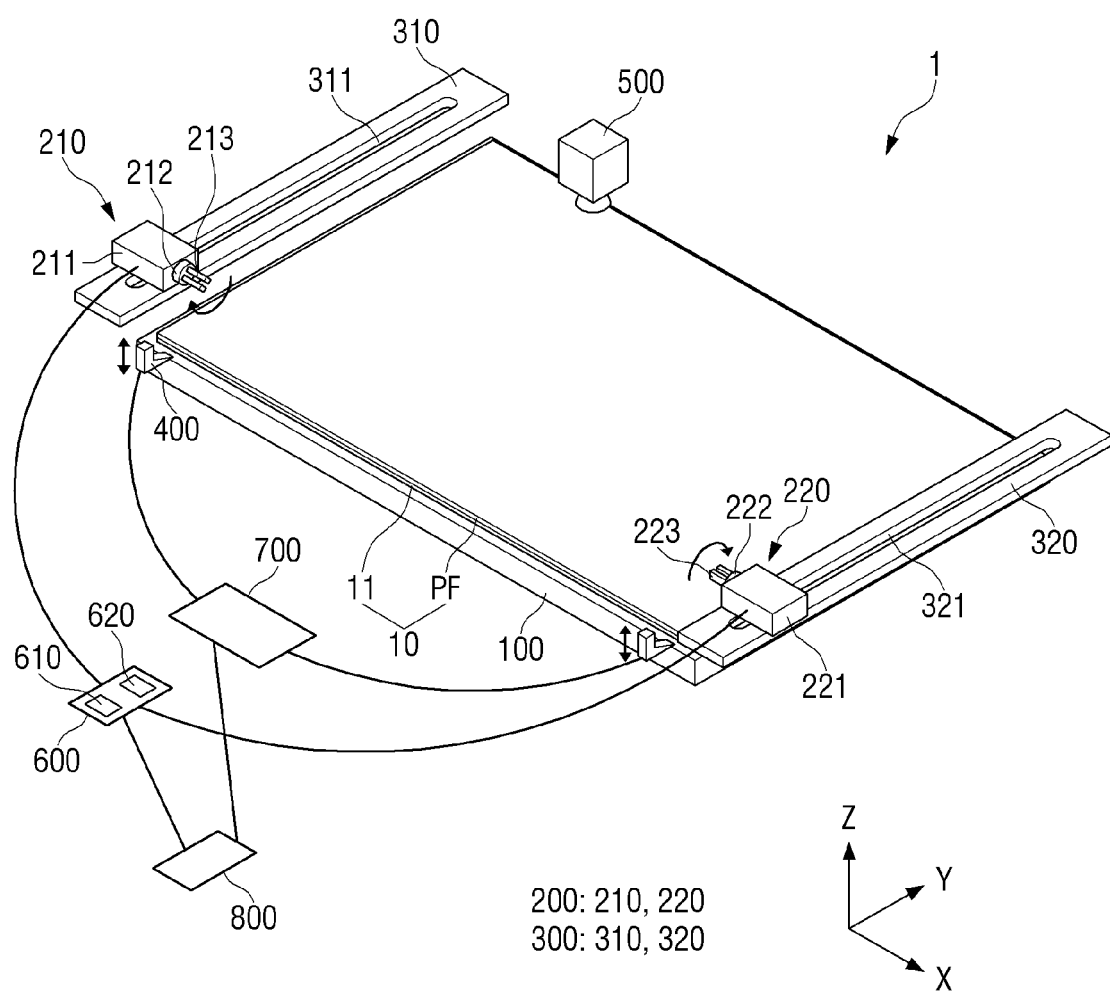
FIG. 3 is a perspective view of an apparatus for manufacturing a display device according to embodiments described herein.
Figure 4:
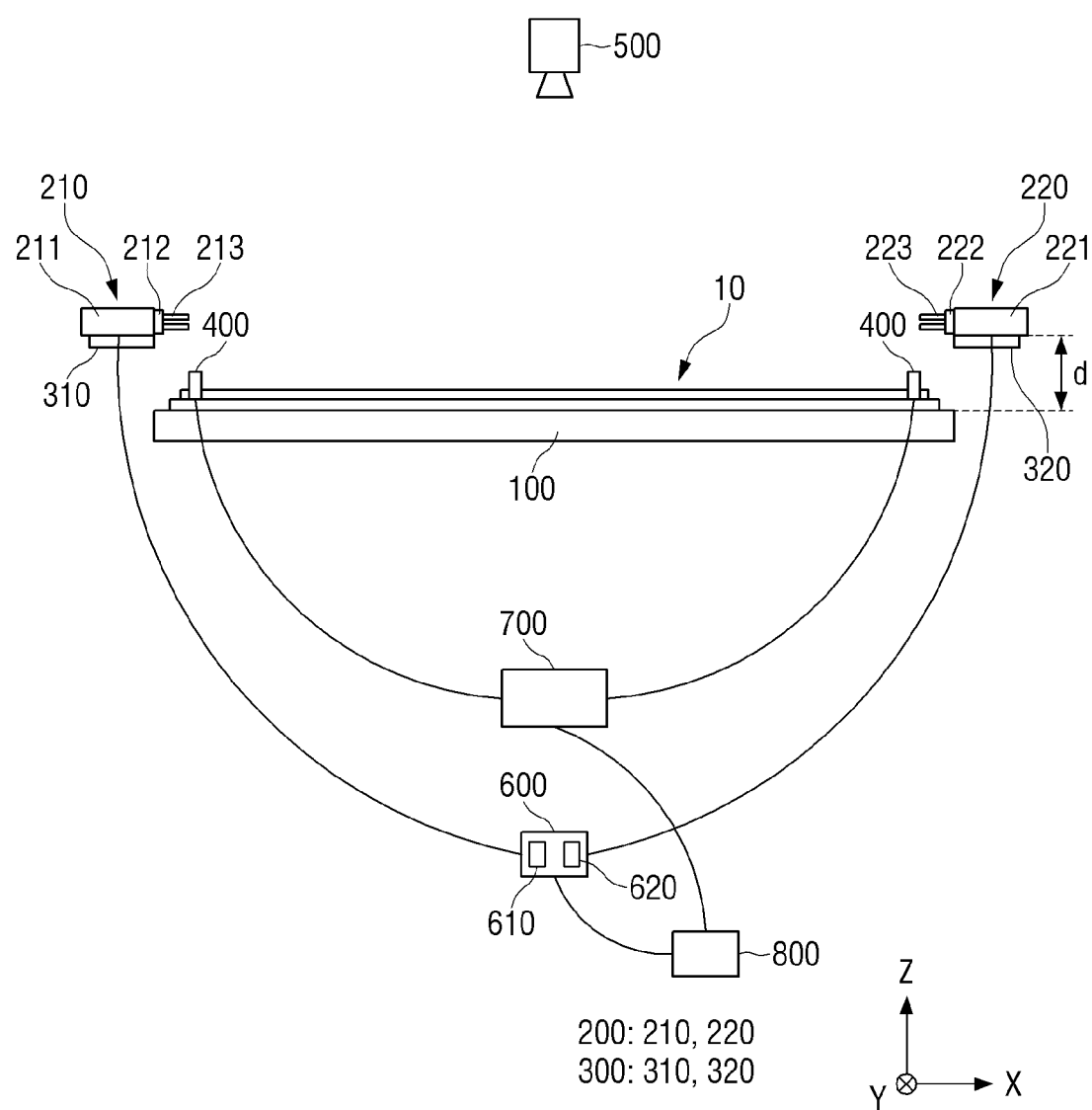
FIG. 4 is a side view of an apparatus for manufacturing a display device according to embodiments described herein.

FIG. 3 is a perspective view of an apparatus for manufacturing a display device according to embodiments described herein. FIG. 4 is a side view of an apparatus for manufacturing a display device according to embodiments described herein.

Referring to FIGS. 3 and 4, the display device manufacturing apparatus 1 according to embodiments may include a stage 100, a peeling unit 200 disposed at one side and another side of the stage 100 in the first direction X, a guide unit 300 configured to guide the movement of each peeling unit 200, a needle unit 400 disposed adjacent to the other end of each guide unit 300 in the second direction Y and of which the tip is disposed toward one side in the second direction Y, a laser module 500 positioned above the stage 100 and emitting a laser beam, a peeling unit driver 600 configured to drive the peeling unit 200, a needle driver 700 configured to drive the needle unit 400, and a controller 800 configured to control the peeling unit driver 600 and the needle driver 700.

A target substrate 10 to be peeled may be disposed on the stage 100. The target substrate 10 may include the parent substrate 11 and the protective film PF attached to the parent substrate 11. The shape of the stage 100 may be a rectangle in plan view, but is not limited thereto, and may be a circle, an ellipse, or another polygon.

The peeling unit 200 may be disposed at one side and the other side of the stage 100 in the first direction X. Specifically, the peeling unit 200 may include a first peeling unit 210 disposed at the other side of the stage 100 in the first direction X and a second peeling unit 220 disposed at one side of the stage 100 in the first direction X. Though the peeling unit 200 includes the first peeling unit 210 and the second peeling unit 220, together they may be referred to herein as the peeling unit 200. The peeling unit 200 may be positioned higher than the stage 100. The peeling unit 200 may be configured to be movable on the guide unit 300 to be described later. The peeling unit 200 may partially overlap one end and the other end of the stage 100 in the first direction X. The first peeling unit 210 and the second peeling unit 220 may be disposed opposite to each other in the first direction X.

The first peeling unit 210 may include a first moving part 211, a first rotating part 212 disposed on one side of the first moving part 211 in the first direction X, and a first gripping part 213 disposed on one side of the first rotating part 212 in the first direction X. The second peeling unit 220 may include a second moving part 221, a second rotating part 222 disposed on the is other side of the second moving part 221 in the first direction X, and a second gripping part 223 disposed on the other side of the second rotating part 222 in the first direction X.

The first moving part 211 of the first peeling unit 210 and the second moving part 221 of the second peeling unit 220 may be configured to be movable in the second direction Y on the guide unit 300 to be described later. The first moving part 211 and the second moving part 221, which are opposite to each other, may move together by the same distance in the same direction. Moving together may refer to moving at substantially the same rate along the guide unit 300 when driven by the peeling unit driver 600.

The first rotating part 212 of the first peeling unit 210 and the second rotating part 222 of the second peeling unit 220 may rotate clockwise or counterclockwise about an axis extending in the first direction X. The first rotating part 212 of the first peeling unit 210 and the second rotating part 222 of the second peeling unit 220, which are disposed opposite to each other in the first direction X, may rotate in opposite directions at substantially the same rate and time. For example, when the first rotating part 212 of the first peeling unit 210 rotates clockwise, the second rotating part 222 of the second peeling unit 220 may rotate counterclockwise at substantially the same rate. However, the inventive concepts are not limited thereto, and when the second rotating part 222 of the second peeling unit 220 rotates clockwise, the first rotating part 212 of the first peeling unit 210 may rotate counterclockwise at substantially a same rate. The first rotating part 212 may be coupled to the first moving part 211 to follow the movement of the first moving part 211, and the second rotating part 222 may be coupled to the second moving part 221 to follow the movement of the second moving part 221.

The first gripping part 213 and the second gripping part 223 may be configured to grip different components. For example, the first gripping part 213 and the second gripping part 223 may each include two grippers, i.e., a first gripper and a second gripper, extending in the first direction X, and grip a different component by adjusting a gap between the first gripper and the second gripper. The gap between the first gripper and the second gripper may be implemented when configuring the display device manufacturing apparatus 1 in relation to different components to be used.

The first gripping part 213 may be coupled to the first rotating part 212 to follow the rotation of the first rotating part 212, and the second gripping part 223 may be coupled to the second rotating part 222 to follow the rotation of the second rotating part 222. In addition, as described above, because the movement of the first rotating part 212 follows the first moving part 211 and the movement of the second rotating part 222 follows the second moving part 221, the movement of the first gripping part 213 and the movement of the second gripping part 223 may also follow the first moving part 211 and the second moving part 221, respectively. The first gripping part 213 and the second gripping part 223 may be disposed to overlap the stage 100 in a third direction Z.

The first peeling unit 210 and second peeling unit 220 of the peeling unit 200 may be respectively guided by a first guide unit 310 and a second guide unit 320 of the guide unit 300 to move in the second direction Y. Though the guide unit 300 includes the first guide unit 310 and the second guide unit 320, together they may be referred to herein as the guide unit 200. That is, the guide unit 300 may guide the movement of the peeling unit 200. The guide unit 300 may have a shape extending in the second direction Y. The first guide unit 310 is configured to guide the movement of the first peeling unit 210 and the second guide unit 320 is configured to guide the movement of the second peeling unit 220. The first guide unit 310 may be disposed at the other side of the stage 100 in the first direction X, and the second guide unit 320 may be disposed at one side of the stage 100 in the first direction X. The first peeling unit 210 may be disposed on the first guide unit 310, and the second peeling unit 220 may be disposed on the second guide unit 320.

The first guide unit 310 may include a first guide fastening part 311, and the second guide unit 320 may include a second guide fastening part 321. Specifically, the first moving part 211 of the first peeling unit 210 may be fastened to the first guide fastening part 311 to move in the second direction Y, and the second moving part 221 of the second peeling unit 220 may be fastened to the second guide fastening part 321 to move in the second direction Y. The first guide fastening part 311 and the second guide fastening part 321 may have a shape extending in the second direction Y. The first guide fastening part 311 and the second guide fastening part 321 may have a groove shape, but are not limited thereto and may have a hole shape opened in the third direction Z.

The first moving part 211 may have a protrusion (not illustrated) that extends into the first guide fastening part 311 to move the first moving part 211 along the first guide fastening part 311. Likewise, the second moving part 221 may also have a protrusion (not illustrated) that extends into the second guide fastening part 321 to move the second moving part 221 along the second guide fastening part 321.

The guide unit 300 may not overlap the stage 100 in the third direction Z. The top surface of the guide unit 300 may be disposed to be spaced apart from the top surface of the stage 100 by a first distance d in the third direction Z. One end and the other end of the guide unit 300 in the second direction Y may protrude more outward than one end and the other end of the stage 100 in the second direction Y, respectively, but are not limited thereto.

The needle unit 400 may be disposed at the other side of the stage 100 in the second direction Y. The needle unit 400 may be configured to initially peel off the protective film PF from is the parent substrate 11 in the target substrate 10 to provide it to the first gripping part 213 of the first peeling unit 210. The needle unit 400 may include a sharp tip. The tip of the needle unit 400 may be disposed toward one side in the second direction Y. The tip of the needle unit 400 may be inserted between the protective film PF and the parent substrate 11 to initially peel off the protective film PF. The needle unit 400 may move in the third direction Z and may rotate about an axis extending in the first direction X. Through this configuration, the needle unit 400 may provide the initially peeled protective film PF to the first peeling unit 210. The needle unit 400 may include one or more needles used to peel off the protective film PF from the parent substrate 11.

The laser module 500 may be disposed above the stage 100. The laser module 500 may emit a laser beam L (see FIG. 6) toward the stage 100. The laser module 500 may horizontally move in the first direction X and the second direction Y, above the stage 100. Although not illustrated, the laser emission of the laser module 500 may be controlled by a laser controller (not illustrated). The laser module 500 may include, for example, a gas laser such as a carbon dioxide laser, an excimer laser, a helium-neon laser, and a helium-selenium laser (green laser), or a solid-state laser such as a ruby laser, a glass laser, a YAG laser, and a YLF laser.

The movement and rotation of the peeling unit 200 may be driven by the peeling unit driver 600. The peeling unit driver 600 may include a movement driver 610 and a rotation driver 620. The movement driver 610 may drive the first moving part 211 and the second moving part 221 to move along the first guide unit 310 and the second guide unit 320, respectively. In addition, the rotation driver 620 may drive the first rotating part 212 and the second rotating part 222 to rotate clockwise or counterclockwise. The driving of the movement driver 610 and the rotation driver 620 may be controlled by the controller 800 as described herein.

The initial peeling process using the one or more needles of the needle unit 400 may is be driven by the needle driver 700. The needle driver 700 may move the needle unit 400 such that the tip of the needle unit 400 is inserted between the protective film PF and the parent substrate 11 so as to perform the initial peeling. In addition, the needle driver 700 may drive the needle unit 400 such that the initially peeled protective film PF is provided to the first gripping part 213 of the first peeling unit 210 and the second gripping part 223 of the second peeling unit 220 at substantially a same time. For example, the needle driver 700 may drive the needle unit 400 to move in the third direction Z and rotate about an axis extending in the first direction X while supporting the bottom portion of the initially peeled protective film PF, such that the initially peeled protective film PF is provided to the first gripping part 213 of the first peeling unit 210 and the second gripping part 223 of the second peeling unit 220. The driving of the needle driver 700 may be controlled by the controller 800 as described herein.

As described herein, the controller 800 may control the driving of the peeling unit driver 600 and the needle driver 700. Specifically, the controller 800 may control the needle driver 700 such that the initial peeling of the protective film PF is performed by the needle unit 400 and the initially peeled protective film PF is provided to the peeling unit 200. In addition, the controller 800 may control the peeling unit driver 600 such that the protective film PF is gripped by the first gripping part 213 and the second gripping part 223 and peeled off by the driving of the first moving part 211 and the first rotating part 212 of the first peeling unit 210 and by the driving of the second moving part 221 and the second rotating part 222 of the second peeling unit 220.

The peeling process of the protective film PF using the display device manufacturing apparatus 1 according to embodiments described herein with reference to FIGS. 5 to 13. Hereinafter, a description of the peeling process will be made of the first peeling unit 210, but the description thereof may be equally applied to the second peeling unit 220.

Figure 5:
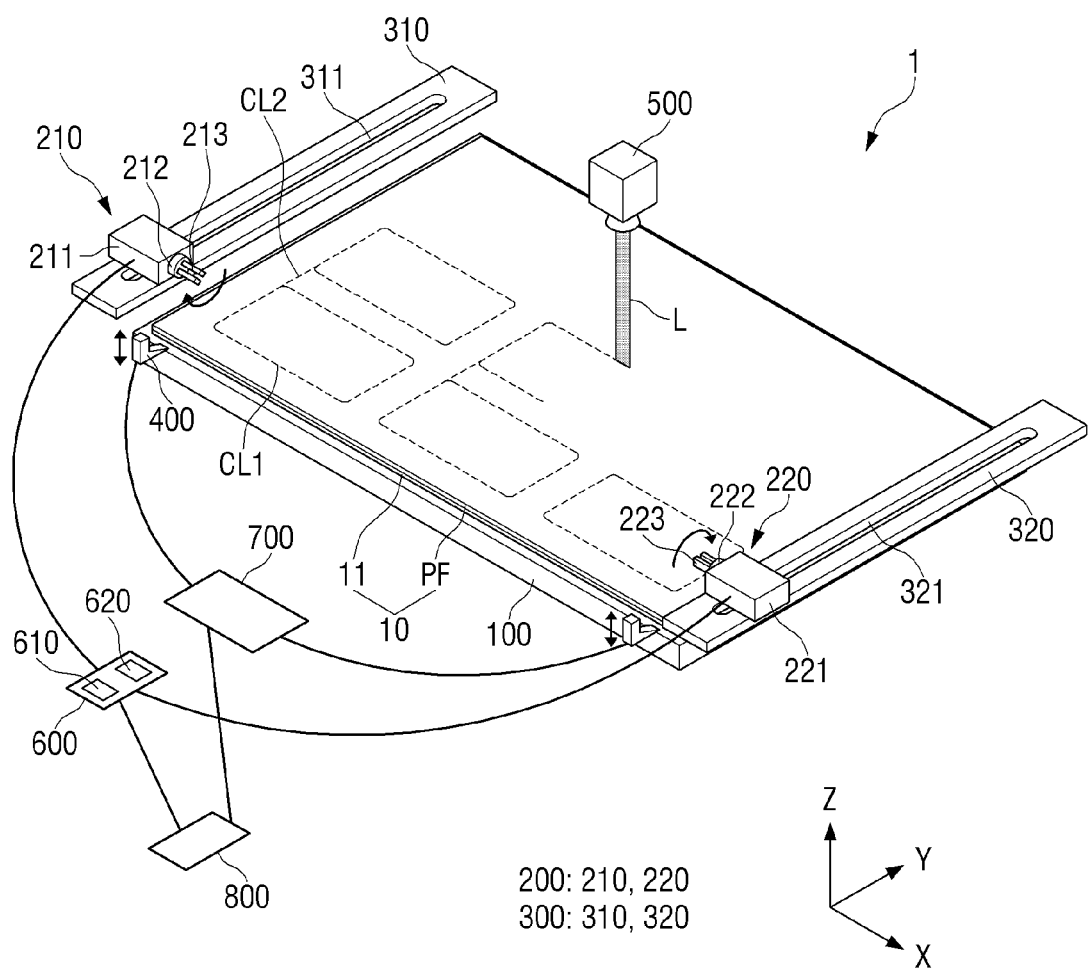
FIGS. 5 and 6 are diagrams illustrating a laser beam irradiation process using an apparatus for manufacturing the display device according to embodiments described herein.
Figure 6:
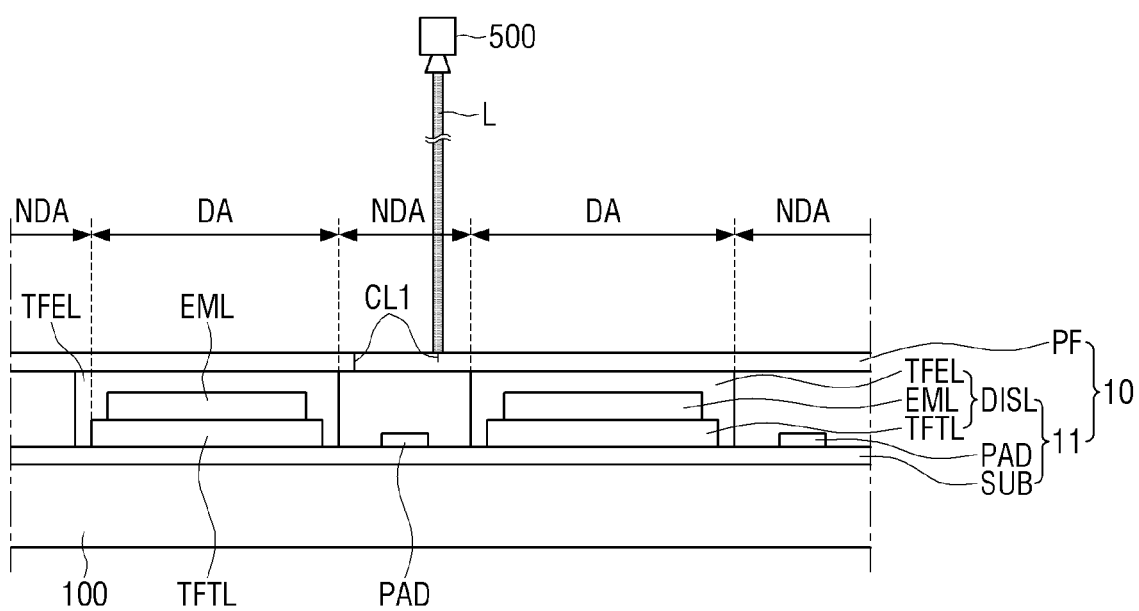
Figure 7:
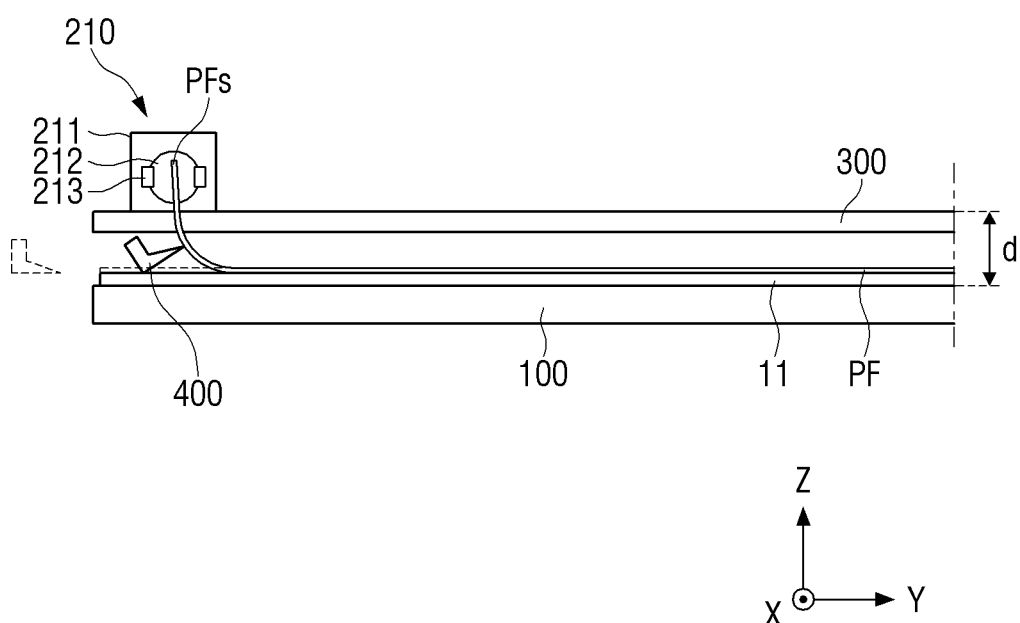
FIGS. 7, 8, 9, and 10 are schematic diagrams specifically illustrating a peeling process of a protective film.
Figure 8:
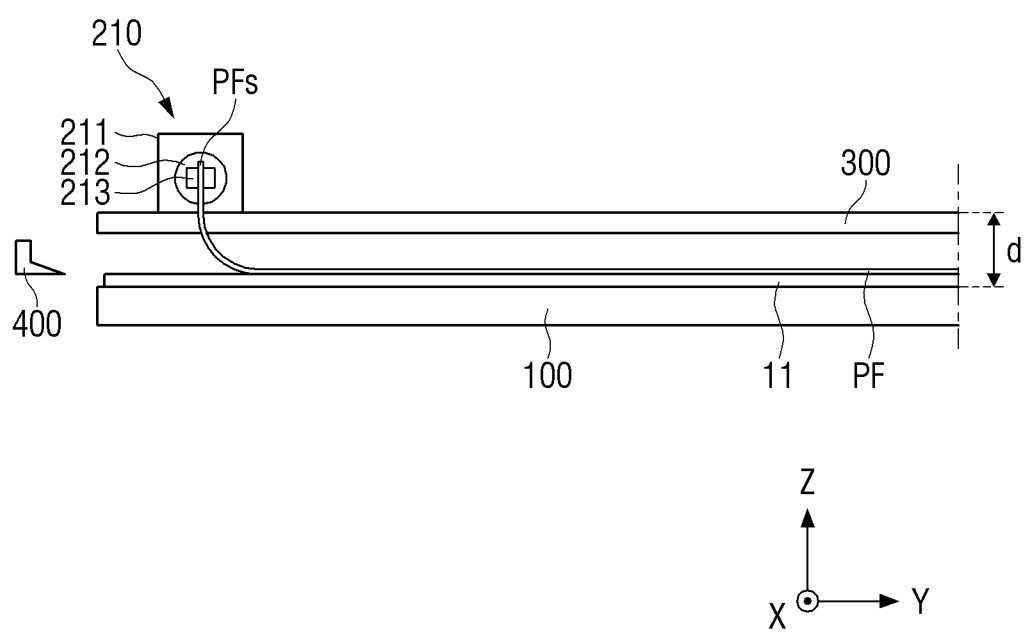
Figure 9:
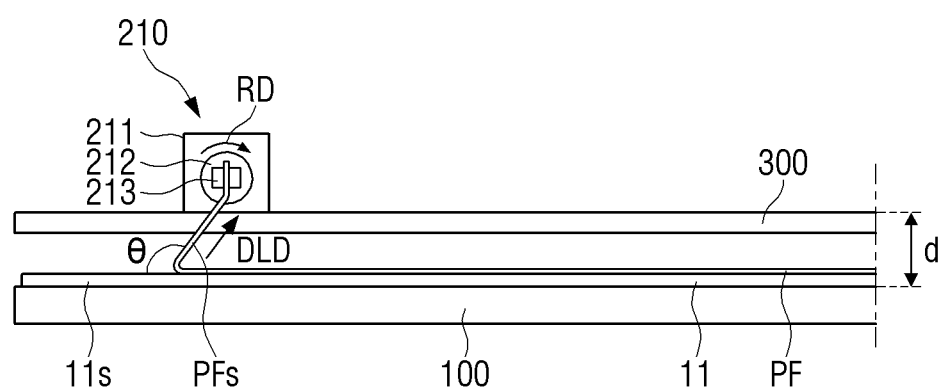
Figure 10:
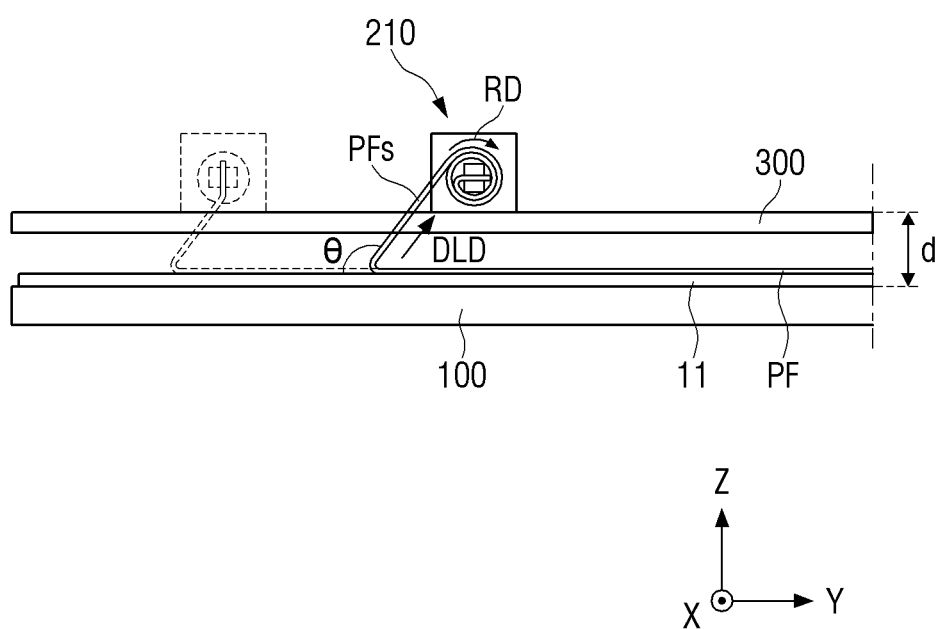
Figure 11:
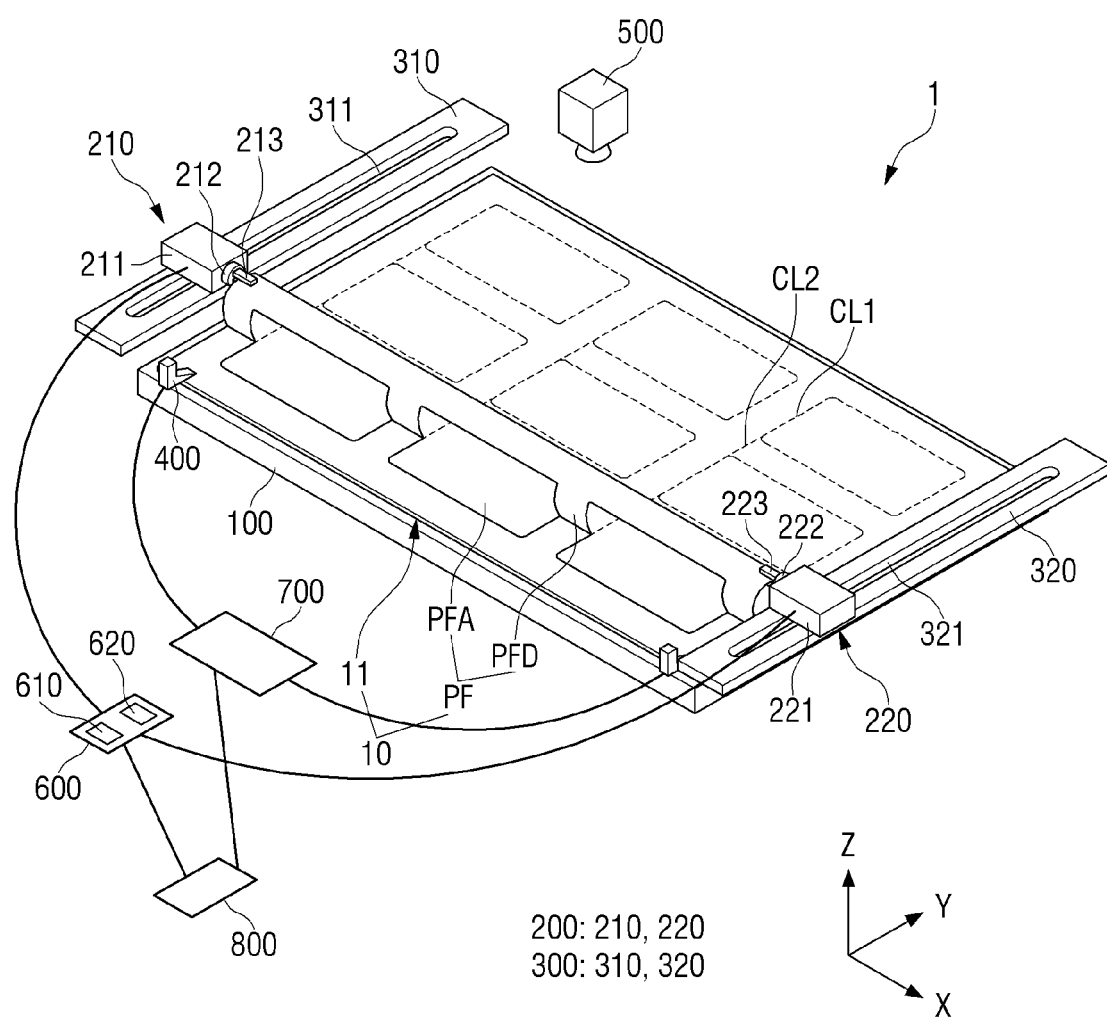
FIGS. 11, 12, and 13 are diagrams illustrating a peeling process of a protective film using an apparatus for manufacturing the display device according to embodiments described herein.
Figure 12:
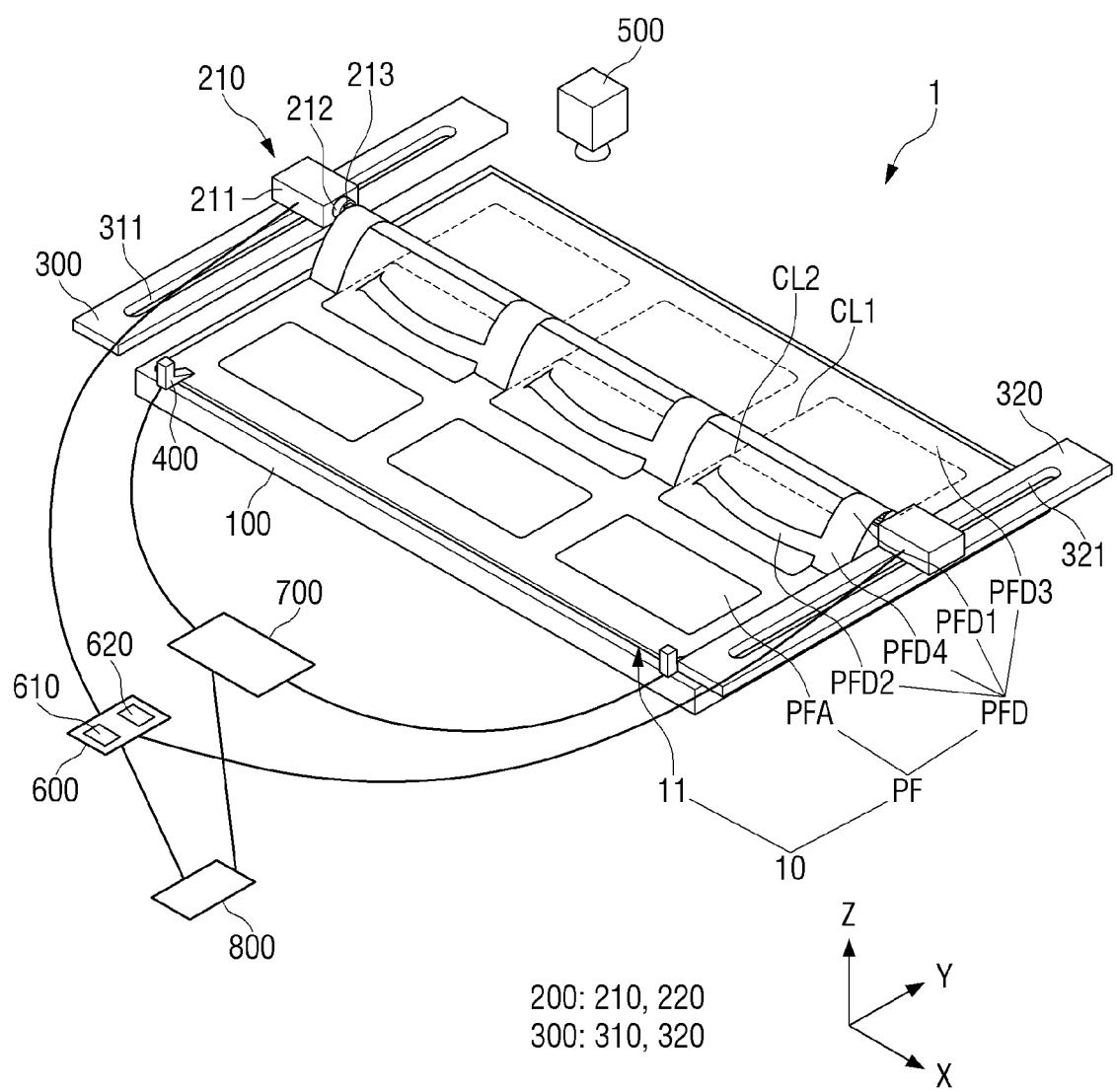
Figure 13:
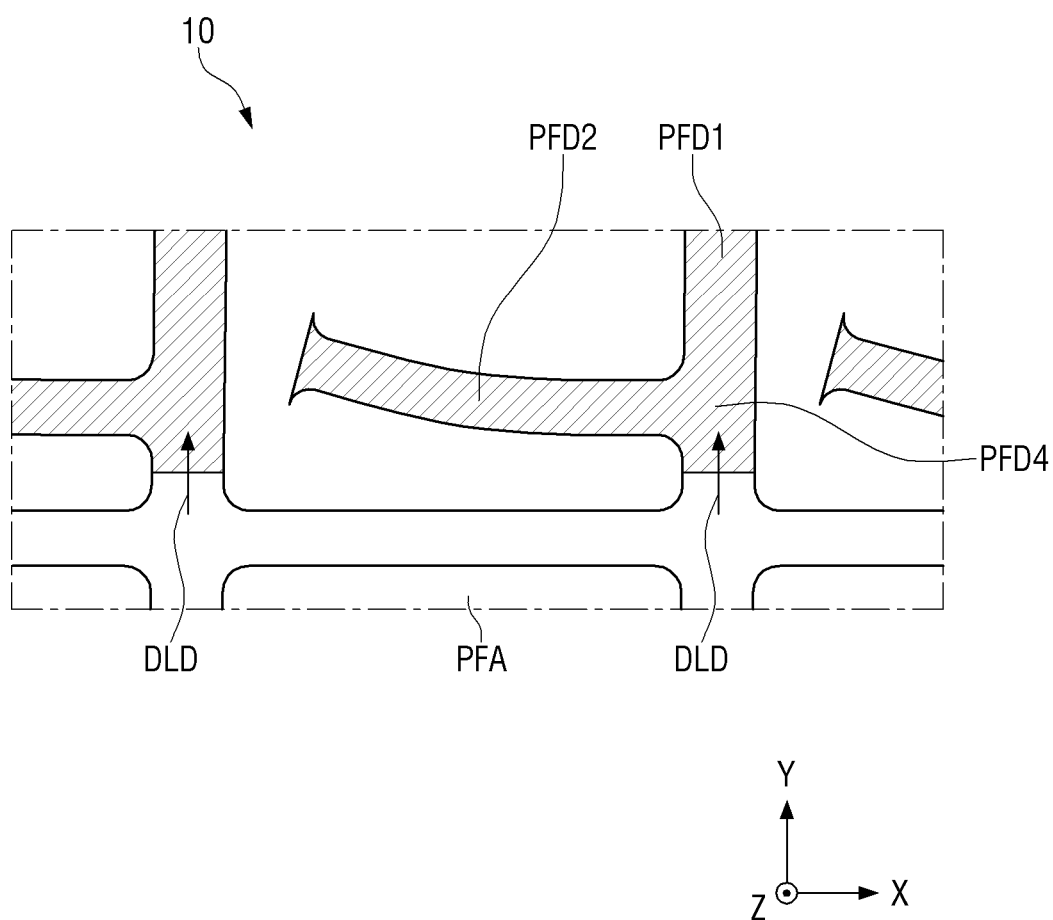

FIGS. 5 and 6 are diagrams illustrating a laser beam irradiation process using an apparatus for manufacturing the display device according to embodiments described herein. FIGS. 7, 8, 9, and 10 are schematic diagrams specifically illustrating a peeling process of a protective film. FIGS. 11, 12, and 13 are diagrams illustrating a peeling process of a protective film using an apparatus for manufacturing the display device according to embodiments described herein.

Referring to FIGS. 5 to 13, the target substrate 10 to be peeled may include the parent substrate 11 and the protective film PF attached to the parent substrate 11. The parent substrate 11 may include a base substrate SUB including the display area DA and the non-display area NDA, a display layer DISL disposed in the display area DA of the base substrate SUB, and the plurality of pads PAD disposed in the non-display area NDA of the base substrate SUB. The display layer DISL may include a thin film transistor layer TFTL, a light emitting layer EML disposed on the thin film transistor layer TFTL, and an encapsulation layer TFEL disposed to cover the thin film transistor layer TFTL and the light emitting layer EML.

The protective film PF may be disposed to entirely overlap the base substrate SUB to protect the parent substrate 11, but is not limited thereto and may partially overlap the base substrate SUB. The protective film PF may be disposed to directly contact the encapsulation layer TFEL disposed in the display area DA of the parent substrate 11, but to be spaced apart in the third direction Z from the pads PAD disposed in the non-display area NDA. At least one surface of the protective film PF may include a flat surface.

The protective film PF may include an active region PFA (illustrated in FIGS. 11-13) overlapping the display area DA, and a dummy region PFD overlapping the non-display area NDA and the non-cell area NCA. The dummy region PFD may be disposed to surround the active region PFA. As will be described later, a part of the protective film PF that is peeled off before the is cutting process of the parent substrate 11 may be the dummy region PFD. On the other hand, the active region PFA of the protective film PF may not be peeled off and may remain attached to the parent substrate 11 in the cutting process of the parent substrate 11.

The active region PFA may protect the display area DA of the display panel DP to be manufactured through a later process. When damage such as a scratch occurs on the top surface of the active region PFA, the thin film transistor layer TFTL and the light emitting layer EML disposed in the display area DA may be electrically affected. Therefore, it may be desirable to prevent damage such as a scratch from occurring on the top surface of the active region PFA in the peeling process of the protective film PF. To this end, as described above, the top surface of the guide unit 300 that guides the movement of the first peeling unit 210 and the top surface of the stage 100 may be disposed to be spaced apart from each other by the first distance d (illustrated in FIGS. 7-10) in the third direction Z.

As illustrated in FIGS. 12 and 13, the dummy region PFD may include a first dummy region PFD1 disposed between the active regions PFA adjacent to each other in the first direction X and having a shape extending in the second direction Y. The dummy region PFD may include a second dummy region PFD2 disposed between the active regions PFA adjacent to each other in the second direction Y and having a shape extending in the first direction X. The dummy region PFD may also include a third dummy region PFD3 constituting the edge of the protective film PF to surround the active region PFA, the first dummy region PFD1, and the second dummy region PFD2 in the protective film PF. The dummy region PFD may also include a fourth dummy region PFD4 disposed in an area where the first dummy region PFD1 crosses the second dummy region PFD2.

The protective film PF may include a transparent film. For example, the protective is film PF may include at least any one selected from the group consisting of polyethylene terephthalate (PET), polyethylene naphthalate (PEN), polycarbonate (PC), polymethyl methacrylate (PMMA), polystyrene (PS), polyvinylchloride (PVC), polyethersulfone (PES), polyethylene (PE), polypropylene (PP), and polyimide (PI), but is not limited thereto.

Cutting lines CL1 and CL2 may be formed on the protective film PF of the target substrate 10. The cutting lines CL1 and CL2 may be formed by the laser beam L emitted from the laser module 500. Specifically, when the laser beam L is emitted from the laser module 500 and irradiated onto one surface of the protective film PF, an area of the protective film PF irradiated with the laser beam L may be cut to form the cutting lines CL1 and CL2. The cutting lines CL1 and CL2 may include a first cutting line CL1 having a closed curve shape that is formed one for each cell area CA on the parent substrate 11, and a second cutting line CL2 connecting the adjacent first cutting lines CL1.

In the protective film PF, an area surrounded by the first cutting line CL1 having a closed curve shape may be the active region PFA of the protective film PF, and an outer area of the first cutting line CL1 may be the dummy region PFD of the protective film PF. Both the active region PFA and the dummy region PFD of the protective film PF may be removed in a later process, but as described herein, before the cutting process of the parent substrate 11, the dummy region PFD of the protective film PF may be removed.

The cutting process of the protective film PF by the laser beam L is a half-cutting process. By appropriately setting the energy of the laser beam L, an area of the protective film PF irradiated with the laser beam L may be cut, and the base substrate SUB disposed under the protective film PF may not be cut.

After the cutting lines CL1 and CL2 are formed on the protective film PF, at least is a part of the protective film PF may be initially peeled off by using the needle unit 400. As described above, the needle unit 400 may include needles having a sharp tip. The initial peeling of the protective film PF may refer to first peeling of a part of the dummy region PFD of the protective film PF. The initial peeling may be performed in a corner where the other edge of the protective film PF in the second direction Y and one edge thereof in the first direction X meet, and in a corner where the other edge of the protective film PF in the second direction Y and the other edge thereof in the first direction X meet. That is, the dummy region PFD in which the initial peeling is performed may be a part of the third dummy region PFD3.

The initial peeling of the protective film PF may be performed by moving the needle unit 400 to one side in the second direction Y and inserting the tip of the needle unit 400 between the protective film PF and the parent substrate 11. In the initial peeling of the dummy region PFD, the needle unit 400 inserted between the protective film PF and the parent substrate 11 may move in the third direction Z or rotate about an axis extending in the first direction X to provide the protective film PF to the peeling unit 200. One or more needles of the needle unit 400 are configured to rotate upward to lift the protective film PF.

After initially peeling at least a part of the protective film PF with the needle unit 400, the initially peeled protective film PF may be provided to the first peeling unit 210. The dummy region PFD of the initially peeled protective film PF may be provided to the first gripping part 213 of the first peeling unit 210 by the needle unit 400. When the dummy region PFD of the protective film PF is provided to the first gripping part 213 of the first peeling unit 210, the first gripping part 213 of the first peeling unit 210 may grip the dummy region PFD of the protective film PF. An operation of providing the protective film PF to the first peeling unit 210 and an operation of gripping the dummy region PFD of the provided protective film PF with the first gripping part 213 of the first peeling unit 210 may be performed substantially simultaneously with the second gripping part 223 of the second peeling unit 220, but is not limited thereto and may be performed separately.

When the initially peeled protective film PF is provided to the first peeling unit 210, the protective film PF may be gripped by the first peeling unit 210 to be completely peeled off. As illustrated in FIG. 13, by the movement of the first peeling unit 210, the protective film PF may be peeled off by receiving a force of a peeling vector DLD. The peeling vector DLD may include the magnitude and direction of a force by which the protective film PF is peeled off by the first peeling unit 210. As illustrated in FIGS. 9 and 10, the protective film PF may be peeled off while forming a predetermined peeling angle θ. The peeling angle θ may refer to an angle between a peeled protective film PFs and a parent substrate 11s of which the top surface is exposed by the peeling of the protective film PF. The peeling angle θ may be the same as the angle of the peeling vector DLD with respect to the stage 100, but is not limited thereto. The peeling angle θ may be an obtuse angle. When the peeling angle θ is an obtuse angle, a tension received by the peeled protective film PFs decreases, thereby preventing the occurrence of tearing. For example, the peeling angle θ may be 120° to 150°, but is not limited thereto.

When the first gripping part 213 of the first peeling unit 210 grips the dummy region PFD of the provided protective film PF, the first moving part 211 of the first peeling unit 210 may be driven to move to one side in the second direction Y along the guide unit 300. At this time, rotation by the first rotating part 212 may not occur.

When a predetermined peeling angle θ is formed through the movement of the first peeling unit 210, the rotation of the first rotating part 212 and the movement of the first moving part 211 may be performed together in the first peeling unit 210. Because the rotation of the first is rotating part 212 and the movement of the first moving part 211 are performed together while the first gripping part 213 of the first peeling unit 210 grips the dummy region PFD of the protective film PF, the peeling angle θ may be maintained at an obtuse angle during the peeling process, but is not limited thereto. In addition, FIG. 10 illustrates that a rotation direction RD of the first rotating part 212 of the first peeling unit 210 is a clockwise direction, but is not limited thereto and the rotation direction RD of the first rotating part 212 may be a counterclockwise direction.

Hereinafter, the behavior of the dummy region PFD that appears when the first peeling unit 210 peels off the dummy region PFD of the protective film PF while simultaneously rotating and moving will be further described.

When the first peeling unit 210 and the second peeling unit 220 rotate and move at substantially the same time while gripping the dummy region PFD of the protective film PF with the first gripping part 213 and the second gripping part 223, respectively, the dummy region PFD of the protective film PF may be peeled off by being wound around the first peeling unit 210 and the second peeling unit 220. The first dummy region PFD1 may be continuously wound to be peeled off under the force of the peeling vector DLD. The second dummy region PFD2 may, simultaneously with peeling, be separated from the first dummy region PFD1 that was adjacent thereto with the second cutting line CL2 interposed therebetween before the peeling. When the second dummy region PFD2 is separated from the first dummy region PFD1 due to the tension caused by the elasticity of the protective film PF itself, the second dummy region PFD2 may be separated at one side in the first direction X. Because the top surface of the stage 100 and the top surface of the guide unit 300 are separated from each other by the first distance d, although the second dummy region PFD2 is peeled off and separated from the first dummy region PFD1, it may not affect the active region PFA.

Air bubbles may be generated at the time of peeling, due to the second dummy region PFD2 extending in the first direction X, in the corner of the active region PFA adjacent to the fourth dummy region PFD4 where the first dummy region PFD1 and the second dummy region PFD2 intersect. However, due to the second cutting line CL2, the fourth dummy region PFD4 and the second dummy region PFD2 may be separated from each other at substantially a same time as the peeling, thereby effectively preventing the generation of the air bubbles.

When the first peeling unit 210 proceeds to one end of the guide unit 300 in the second direction Y while simultaneously rotating and moving, the dummy region PFD of the protective film PF may be completely peeled off, so that the peeling process of the protective film PF may be terminated.

In the display device manufacturing apparatus 1 according to embodiments described herein, when the protective film PF is peeled off, the protective film PF may be stably peeled off without damaging the active region PFA of the protective film PF, while effectively preventing air bubbles from being generated in the corner of the active region PFA adjacent to the fourth dummy region PFD4.

Figure 14:
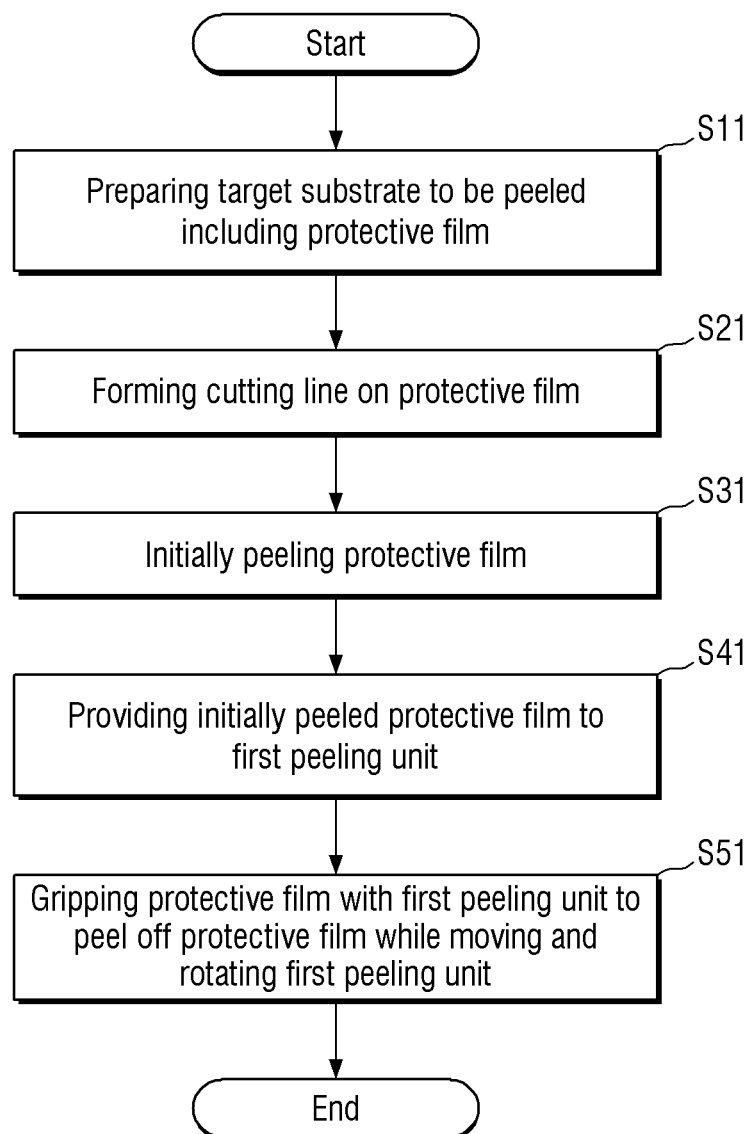
FIG. 14 is a flowchart illustrating a method for manufacturing a display device according to embodiments described herein.

FIG. 14 is a flowchart illustrating a method for manufacturing a display device according to embodiments described herein.

Referring to FIG. 14, a method for manufacturing the display device according to embodiments described herein relates to a process of peeling off a part of the protective film PF attached to the display panel DP. The method for manufacturing the display device according to embodiments may include an operation of preparing a target substrate to be peeled including the protective film (operation S11), an operation of forming a cutting line on the protective film (operation S21), an operation of initially peeling the protective film (operation S31), an operation is of providing the initially peeled protective film to the first peeling unit (operation S41), and an operation of gripping the protective film with the first peeling unit and peeling off the protective film while moving and rotating the first peeling unit (operation S51). That is, the method for manufacturing the display device according to embodiments described herein relates to the peeling of the protective film PF using the display device manufacturing apparatus 1 according to embodiments described herein with reference to FIGS. 5 to 13. Therefore, a detailed description thereof will be omitted.

In the method for manufacturing the display device according to embodiments described herein, the dummy region PFD of the protective film PF may be peeled off without damaging the active region PFA of the protective film PF. In addition, in the method for manufacturing the display device, when the dummy region PFD of the protective film PF is peeled off, the air bubbles may be effectively prevented from being generated in the corner, adjacent to the fourth dummy region PFD4, in the active region PFA of the protective film PF.

Hereinafter, other embodiments of the display device manufacturing apparatus 1 will be described. In the following embodiments, a description of the same components as those of the above-described embodiment will be omitted or simplified, and differences will be mainly described.

Figure 15:
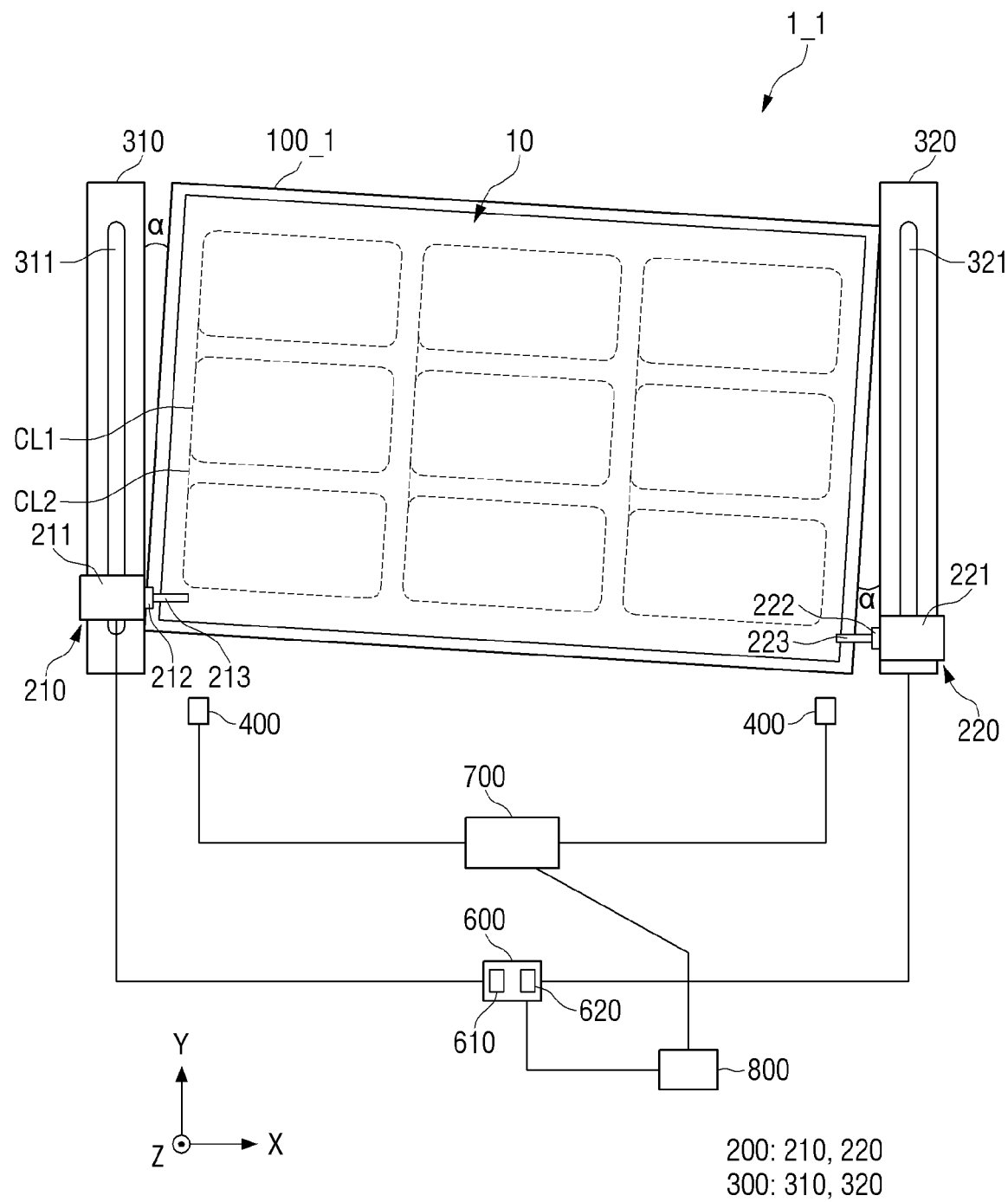
FIG. 15 is a plan view illustrating an apparatus for manufacturing a display device according to embodiments described herein.
Figure 16:
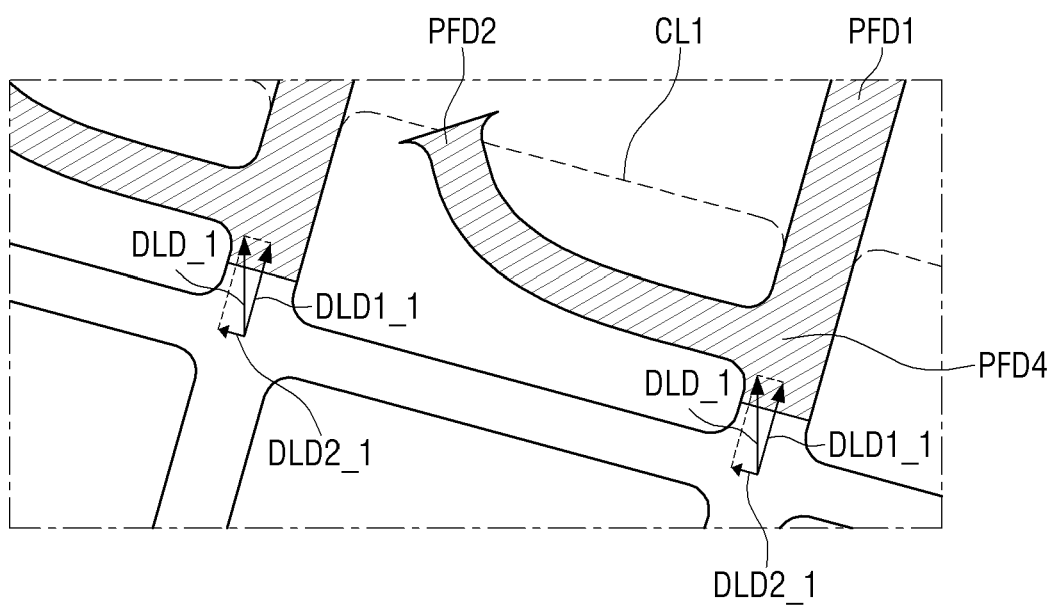
FIG. 16 is a plan view illustrating a process of peeling a protective film using the display device manufacturing apparatus according to FIG. 15.

FIG. 15 is a plan view illustrating an apparatus for manufacturing a display device according to embodiments described herein. FIG. 16 is a plan view illustrating a process of peeling a protective film using the display device manufacturing apparatus according to the embodiment of FIG. 15.

Referring to FIGS. 15 and 16, a display device manufacturing apparatus 1_1 includes a stage 100_1 configured to be rotatable about an axis extending in the third direction Z.

Specifically, the stage 100_1 included in the display device manufacturing apparatus 1_1 according to the present embodiment may have a rectangular shape in plan view. In the display device manufacturing apparatus 1_1 according to the present embodiment, the stage 100_1 is rotatable, so that an edge of the stage 100_1 disposed adjacent to the guide unit 300 may be tilted by a first tilt angle α in the clockwise direction from the second direction Y in plan view. Although not illustrated, the display device manufacturing apparatus 1_1 according to the present embodiment may include a rotation driver (not illustrated) that enables the stage 100_1 to rotate about an axis extending in the third direction Z.

Hereinafter, a process of peeling off the protective film PF using the display device manufacturing apparatus 1_1 according to the present embodiment will be described. Hereinafter, a description of the peeling process may be made regarding the first peeling unit 210, but the description thereof may be equally applied to the second peeling unit 220.

The dummy region PFD of the protective film PF may be peeled off under a force having a peeling vector DLD_1 by using the first peeling unit 210. Due to a first tilt angle α, the peeling vector DLD_1 may be decomposed into a first peeling vector DLD1_1 and a second peeling vector DLD2_1, which have the same directions as the extension directions of the first dummy region PFD1 and the second dummy region PFD2, respectively. That is, the first dummy region PFD1 may be peeled off by a force having the first peeling vector DLD1_1, and the second dummy region PFD2 may be peeled off by a force having the second peeling vector DLD2_1. In a variation of embodiments described herein, the second dummy region PFD2 may be easily peeled off through the second peeling vector DLD2_1 having the same direction as the extension direction of the second dummy region PFD2. That is, when the protective film PF is peeled off through the second peeling vector DLD2_1 that contributes to the peeling of the second dummy region PFD2, is the air bubbles may be effectively prevented from being generated in the corner of the active region PFA adjacent to the fourth dummy region PFD4.

In the display device manufacturing apparatus 1_1 according to the present embodiment, when the protective film PF is peeled off, the protective film PF may be stably peeled off without damaging the active region PFA of the protective film PF.

In addition, the stage 100_1 configured to be rotatable about a central axis extending in the third direction Z may be included, so that when the protective film PF is peeled off by the peeling unit 200, the second peeling vector DLD2_1 having the same direction as the extension direction of the second dummy region PFD2 may be formed. As a result, the second dummy region PFD2 may be easily peeled off, and thus the air bubbles may be effectively prevented from being generated in the corner of the active region PFA adjacent to the fourth dummy region PFD4.

Figure 17:
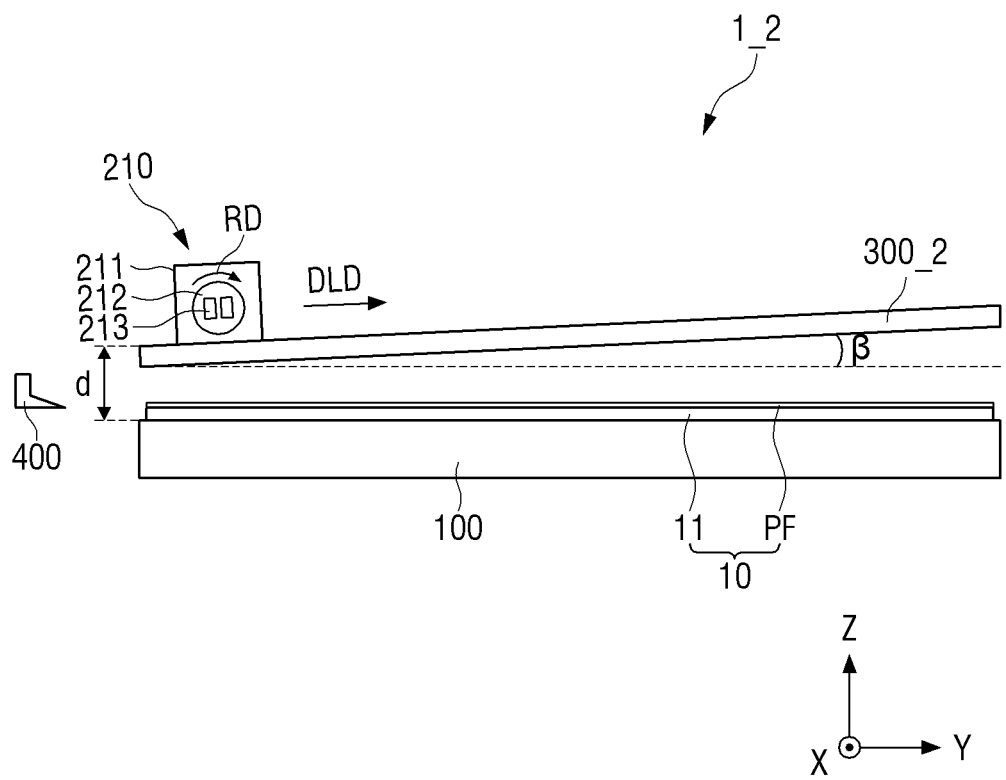
FIG. 17 is a side view of an apparatus for manufacturing a display device according to embodiments described herein.

FIG. 17 is a side view of an apparatus for manufacturing a display device according to embodiments described herein.

A display device manufacturing apparatus 1_2 includes a guide unit 300_2 tilted about an axis extending in the first direction X. In the display device manufacturing apparatus 1_2 according to the present embodiment, the guide unit 300_2 may be tilted by a second tilt angle β with respect to a plane defined by the first direction X and the second direction Y. The first distance d between the top surface of the guide unit 300_2 and the top surface of the stage 100 may increase toward one side in the second direction Y. That is, as the protective film PF is peeled off using the peeling unit 200, the first distance d, which is a separation distance between the top surface of the guide unit 300_2 and the top surface of the stage 100, may increase. Accordingly, it is possible to effectively prevent the peeled dummy region PFD, formed as the peeling process of the protective film PF proceeds, from damaging the active region PFA of the protective film PF.

In the display device manufacturing apparatus 1_2 according to embodiments described herein, when the protective film PF is peeled off, the air bubbles may be effectively prevented from being generated in the corner of the active region PFA adjacent to the fourth dummy region PFD4, thereby stably peeling off the protective film PF.

In addition, the display device manufacturing apparatus 1_2 according to the present embodiment includes the guide unit 300_2 of which a separation distance from the stage 100 increases toward one side in the second direction Y, so that the peeled dummy region PFD, formed at the time of the peeling of the protective film PF, may be effectively prevented from damaging the active region PFA of the protective film PF, thereby stably peeling off the protective film PF.

Figure 18:
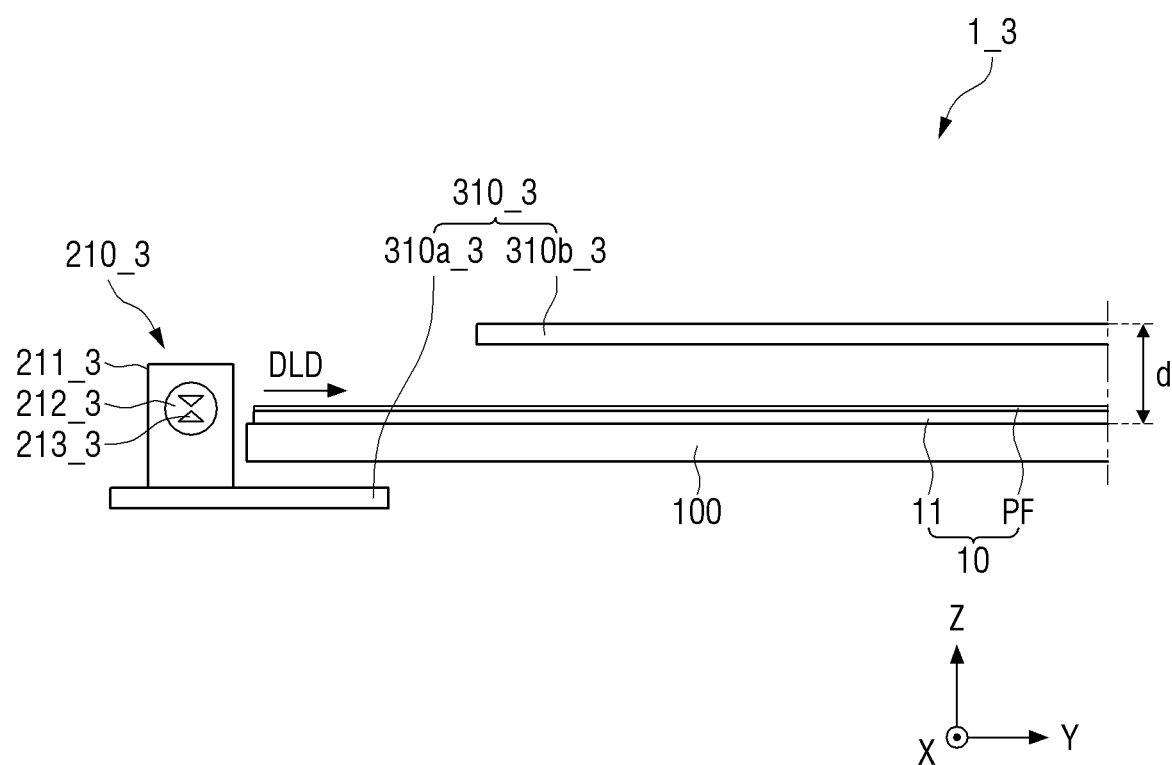
FIG. 18 is a side view of an apparatus for manufacturing a display device according to embodiments described herein.
Figure 19:
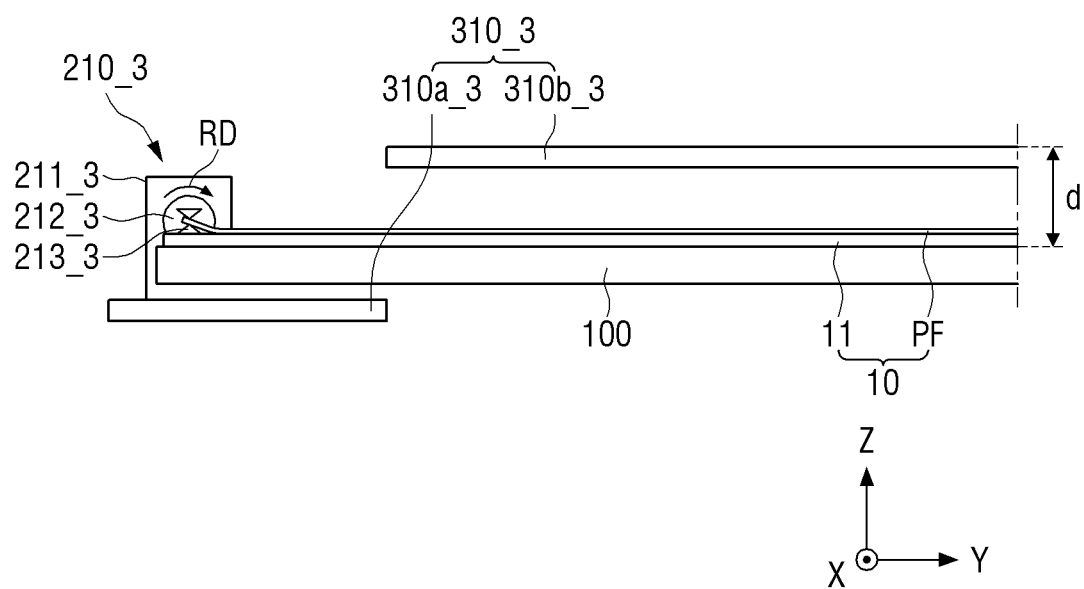
FIGS. 19 and 20 are schematic diagrams illustrating a protective film peeling process using the display device manufacturing apparatus according to FIG. 18.
Figure 20:
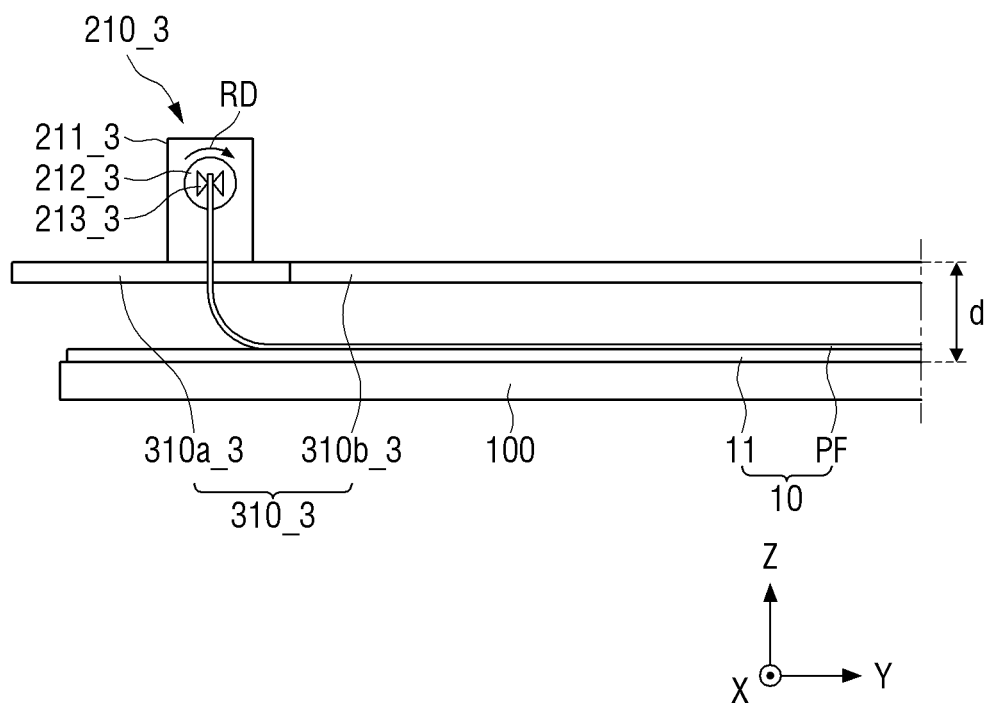

FIG. 18 is a side view of an apparatus for manufacturing a display device according to embodiments described herein. FIGS. 19 and 20 are schematic diagrams illustrating a protective film peeling process using the display device manufacturing apparatus according to the embodiment of FIG. 18.

A display device manufacturing apparatus 1_3 may include a gripping part 213_3 of a first peeling unit 210_3 and a guide unit 300_3, which may have different structures from other embodiments described herein. In addition, in the display device manufacturing apparatus 1_3 according to the present embodiment, a configuration corresponding to the needle unit 400 of the display device manufacturing apparatus 1 according to an earlier embodiment is omitted, and the first peeling unit 210_3 may perform the role of the needle unit 400 of the display device manufacturing apparatus 1 according to an earlier embodiment.

The first peeling unit 210_3 included in the display device manufacturing apparatus 1_3 according to the present embodiment may include the gripping part 213_3 having a sharp end.

A first guide unit 310_3 may include a first sub-guide unit 310a_3 configured to be movable in the third direction Z and a second sub-guide unit 310b_3 positioned higher than the stage 100 and extending in the second direction Y. In the present embodiment, the second sub-guide unit 310b_3 may have a shape extending in the second direction Y, and may be disposed to be spaced apart from the stage 100 by the first distance d toward one side in the third direction Z, in the same way as the guide unit 300 of the display device manufacturing apparatus 1 according to an earlier embodiment.

The first sub-guide unit 310a_3 may be movable in the third direction Z from a position lower than the stage 100 to a position at the same height as the second sub-guide unit 310b_3. The first sub-guide unit 310a_3 that has reached the same height as the second sub-guide unit 310b_3 may be aligned with the second sub-guide unit 310b_3. When the first sub-guide unit 310a_3 and the second sub-guide unit 310b_3 are aligned, one end of the first sub-guide unit 310a_3 in the second direction Y and the other end of the second sub-guide unit 310b_3 in the second direction Y may be coupled to each other while contacting each other. Although not illustrated, the display device manufacturing apparatus 1_3 according to the present embodiment may further include a vertical driver (not illustrated) that drives the movement of the first sub-guide unit 310a_3 in the third direction Z.

Hereinafter, a peeling process of the protective film PF using the display device manufacturing apparatus 1_3 according to the present embodiment will be described. Hereinafter, a description of the peeling process will be made of the first peeling unit 210_3, but the description thereof may be equally applied to the second peeling unit 220_3.

As illustrated in FIG. 19, the display device manufacturing apparatus 1_3 according to the present embodiment may perform the initial peeling of the protective film PF through the is end of the first gripping part 213_3 of the first peeling unit 210_3. In this case, the first sub-guide unit 310a_3 may be positioned lower than the stage 100. Specifically, the position of the first sub-guide unit 310a_3 may be set such that the initial peeling is performed by moving the first peeling unit 210_3 disposed on the first sub-guide unit 310a_3 in the second direction Y, and inserting the end of the first gripping part 213_3 between the protective film PF and the parent substrate 11. That is, in the display device manufacturing apparatus 1_3 according to the present embodiment, the first peeling unit 210_3 may even serve as the needle unit 400 of the display device manufacturing apparatus 1 according to a previously described embodiment.

When the initial peeling of the protective film PF is performed by the first peeling unit 210_3, the protective film PF may be gripped by the first gripping part 213_3, and the first sub-guide unit 310a_3 may move toward one side in the third direction Z to be aligned with the second sub-guide unit 310b_3. When the first sub-guide unit 310a_3 is aligned with the second sub-guide unit 310b_3, the first peeling unit 210_3 may move to one side in the second direction Y toward the second sub-guide unit 310b_3 while gripping the protective film PF, thereby peeling off the protective film PF. Other matters relating to the peeling process of the protective film PF are the same as the peeling process of the protective film PF using the display device manufacturing apparatus 1 according to other embodiments described herein, and thus they will be omitted below.

In the display device manufacturing apparatus 1_3 according to the present embodiment, when the protective film PF is peeled off, the protective film PF may be stably peeled off without damaging the active region PFA of the protective film PF, while effectively preventing air bubbles from being generated in the corner of the active region PFA adjacent to the fourth dummy region PFD4.

In addition, the peeling process of the protective film PF may be precisely is performed by performing an overall peeling process including the initial peeling of the protective film PF by using one component, i.e., the first peeling unit 210_3.

Figure 21:
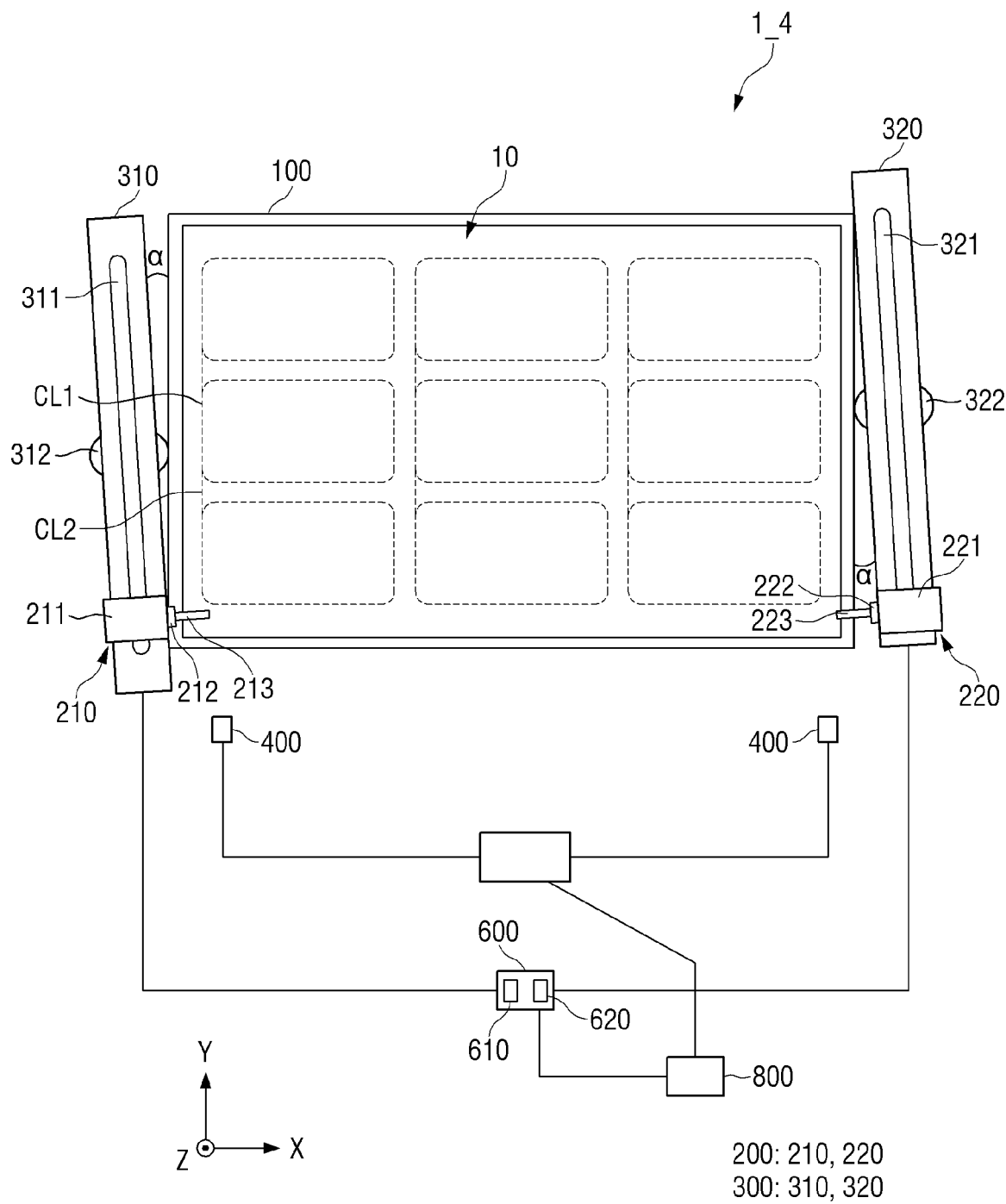
FIG. 21 is a plan view illustrating an apparatus for manufacturing a display device according to embodiments described herein.

FIG. 21 is a plan view illustrating an apparatus for manufacturing a display device according to embodiments described herein.

Referring to FIGS. 16 and 21, a display device manufacturing apparatus 1_4 includes first and second rotating units 312 and 322 that enables the guide unit 300 to rotate about an axis extending in the third direction Z.

Specifically, the display device manufacturing apparatus 1_4 according to the present embodiment may include a first rotating unit 312 disposed under the first guide unit 310 and a second rotating unit 322 disposed under the second guide unit 320.

The first rotating unit 312 may rotate the first guide unit 310 about an axis of the third direction Z, and the second rotating unit 322 may rotate the second guide unit 320 about an axis of the third direction Z.

Similarly to the embodiment described above with reference to FIG. 15, through the first and second rotating units 312 and 322, the edges of the first and second guide units 310 and 320 disposed adjacent to the stage 100 may be tilted by the first tilt angle α from the second direction Y in plan view.

Hereinafter, because the peeling process of the protective film PF using the display device manufacturing apparatus 1_4 according to the present embodiment is substantially the same as that described above with reference to FIG. 16, an additional description thereof will be omitted.

In the display device manufacturing apparatus 1_4 according to the present embodiment, when the protective film PF is peeled off, the protective film PF may be stably peeled off without damaging the active region PFA of the protective film PF.

In addition, the first and second rotating units 312 and 322 that rotate the guide unit 300 about a central axis extending in the third direction Z may be included, so that when the protective film PF is peeled off by the peeling unit 200, the second peeling vector DLD2_1 having the same direction as the extension direction of the second dummy region PFD2 may be formed. As a result, the second dummy region PFD2 may be easily peeled off, and thus the air bubbles may be effectively prevented from being generated in the corner of the active region PFA adjacent to the fourth dummy region PFD4.

In concluding the detailed description, those skilled in the art will appreciate that many variations and modifications can be made to the embodiments without substantially departing from the principles of the present invention. Therefore, the disclosed embodiments of the invention are used in a generic and descriptive sense only and not for purposes of limitation.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method for manufacturing a display device, the method comprising:
    forming a cutting line in a protective film detachably coupled to a target substrate;
    initially peeling a first part of the protective film from the target substrate, the first part of the protective film extending from a second part of the protective film that is detachably coupled to the target substrate;

providing the initially peeled first part of the protective film to both a first peeler disposed on a first side of the target substrate and a second peeler disposed on a second side of the target substrate that opposes the first side of the target substrate in a first direction;

gripping a first corner portion of the initially peeled first part of the protective film with the first peeler and a second corner portion of the initially peeled first part of the protective film with the second peeler; and translating both the first peeler having a grip on the first corner portion and the second peeler having a grip on the second corner portion in a second direction transverse to the first direction while rotating a portion of the first peeler about a first axis of rotation extending in the first direction and a portion of the second peeler about a second axis of rotation extending in the first direction to peel off the second portion of the protective film from the target substrate with respect to the cutting line.

2. The method of claim 1, wherein
the first peeler comprises:
- a first translator that moves along a first guide extending along the first side of the target substrate;
- a first rotator that rotates about the first axis of rotation and is coupled to a first side of the first translator that faces the second peeler; and
- a first gripper coupled to a first side of the first rotator that faces the second peeler, the first gripper overlapping a corresponding first portion of a stage in a third direction orthogonal to both the first direction and the second direction, the target substrate being supported on the stage, the second peeler comprises:
- a second translator that moves along a second guide extending along the second side of the target substrate;
- a second rotator that rotates about the second axis of rotation and is coupled to a first side of the second translator that faces the first peeler; and
- a second gripper coupled to a first side of the second rotator that faces the first peeler, the second gripper overlapping a corresponding second portion of the stage in the third direction, gripping the first corner portion of the initially peeled first part of the protective film with the first peeler comprises gripping the first corner portion of the initially peeled first part of the protective film with the first gripper, and gripping the second corner portion of the initially peeled first part of the protective film with the second peeler comprises gripping the second corner portion of the initially peeled first part of the protective film with the second gripper.

3. The method of claim 2, wherein
translating the first peeler having the grip on the first corner portion of the initially peeled first part of the protective film while rotating the portion of the first peeler about the first axis of rotation comprises translating the first translator along the first guide while the first rotator rotates about the first axis of rotation, and translating the second peeler having the grip on the second corner portion of the initially peeled first part of the protective film while rotating the portion of the second peeler about the second axis of rotation comprises translating the second translator along the second guide while the second rotator rotates about the second axis of rotation.

4. The method of claim 3, further comprising:
translating both the first translator along the first guide prior to rotating the first rotator about the first axis of rotation and the second translator along the second guide prior to rotating the second rotator about the second axis of rotation; and checking a peeling angle of the protective film relative to the target substrate, wherein, in response to the peeling angle being greater than or equal to a first angle, the method comprises rotating the first rotator about the first axis of rotation while the first translator continues to translate along the first guide and the second rotator about the second axis of rotation while the second translator continues to translate along the second guide.

5. The method of claim 4, wherein the first angle is an obtuse angle.

6. The method of claim 2, further comprising:
controlling respective rotation of the first guide and the second guide about corresponding axes of rotation,
wherein
the corresponding axes of rotation comprise:
- a third axis of rotation extending in a third direction through a central portion of the first guide, the third direction being orthogonal to both the first direction and the second direction; and
- a fourth axis of rotation extending in the third direction through a central portion of the second guide.

7. The method of claim 6, wherein
the protective film in which the cutting line is formed comprises:
- at least one first section extending in the second direction; and
- at least one second section extending from the at least one first section in the first direction, and the respective rotation of the first guide and the second guide is controlled about the corresponding axes of rotation so that a nonzero component of a peeling force extends in the first direction while at least a portion of the at least one second section of the protective film is being peeled from the target substrate.

8. The method of claim 2, wherein
the first guide comprises:
- a first guide section moveable along a third direction orthogonal to both the first direction and the second direction; and
- a second guide section, the second guide comprises:
- a third guide section moveable along the third direction; and
- a fourth guide section, and the method further comprises:
- controlling respective heights of the first guide section and the third guide section along the third direction so that both the first guide section and the second guide section are positioned below the target substrate prior to gripping the first corner portion and the second corner portion; and
- controlling the respective heights of the first guide section and the third guide section along the third direction so that both the first guide section and the second guide section are positioned above the target substrate and respectively aligned with the second guide section and the fourth guide section after gripping the first corner portion and the second corner portion.

9. The method of claim 8, wherein both the second guide section and the fourth guide section have respective heights that are fixed above the target substrate.

10. The method of claim 1, wherein
the protective film comprises:
a plurality of active regions overlapping a plurality of light emitting elements disposed on the target substrate; and
a dummy region surrounding each of the active regions in a view in a third direction orthogonal to both the first direction and the second direction, and
forming the cutting line in the protective film comprises:
forming a first cutting line along an edge of each of the active regions; and
forming a second cutting line between adjacent active regions among the active regions.

11. The method of claim 1, further comprising:
controlling rotation of the target substrate about one or more axes of rotation,
wherein the one or more axes of rotation comprises a third axis of rotation extending in a third direction orthogonal to both the first direction and the second direction.

12. The method of claim 11, wherein the third axis of rotation extends through a central portion of the target substrate.

13. The method of claim 11, wherein the one or more axes of rotation further comprises a fourth axis of rotation extending in the first direction.

14. The method of claim 13, wherein
the target substrate extends from a proximal end portion at which the initially peeled first part of the protective film is initially peeled from the target substrate to a distal end portion, and
the fourth axis of rotation is disposed closer to the proximal end portion than to the distal end portion.

15. The method of claim 11, wherein
the protective film in which the cutting line is formed comprises:
at least one first section extending in the second direction; and
at least one second section extending from the at least one first section in the first direction, and
the rotation of the target substrate is controlled about the one or more axes of rotation so that a nonzero component of a peeling force extends in the first direction while at least a portion of the at least one second section of the protective film is being peeled from the target substrate.

16. The method of claim 1, wherein initially peeling the first part of the protective film from the target substrate comprises inserting one or more wedges between the protective film and the target substrate.

17. The method of claim 16, wherein
the one or more wedges are separate from both the first peeler and the second peeler,
initially peeling the first part of the protective film from the target substrate further comprises rotating the one or more wedges about a third axis of rotation extending in the first direction to initially peel the first part of the protective film from the target substrate, and
a direction of rotation of the one or more wedges about the third axis of rotation is different from a direction of rotation of the portion of the first peeler about the first axis of rotation.

18. The method of claim 16, wherein
the one or more wedges comprise:
a first wedge forming a portion of the first peeler that grips the first corner portion of the initially peeled first part of the protective film; and
a second wedge forming a portion of the second peeler that grips the second corner portion of the initially peeled first part of the protective film,
rotation of the portion of the first peeler about the first axis of rotation comprises rotating the first wedge about the first axis of rotation, and
rotation of the portion of the second peeler about the second axis of rotation comprises rotating the second wedge about the second axis of rotation.

19. The method of claim 18, further comprising:
increasing, after gripping the first corner portion and the second corner portion, respective heights of the first peeler and the second peeler above the target substrate.

20. The method of claim 1, wherein
forming the cutting line in the protective film comprises controlling a position of a laser module above the target substrate, and
the method further comprises controlling, prior to translating both the first peeler having a grip on the first corner portion and the second peeler having a grip on the second corner portion in the second direction, the position of the laser module so that the laser module is spaced apart from the target substrate in a view in a third direction orthogonal to both the first direction and the second direction.

* * * * *